(12) United States Patent
Chu et al.

(10) Patent No.: US 10,187,302 B2
(45) Date of Patent: *Jan. 22, 2019

(54) SOURCE ADDRESS TRANSLATION IN OVERLAY NETWORKS

(71) Applicant: Cisco Technology, Inc., San Jose, CA (US)

(72) Inventors: Kit Chiu Chu, Fremont, CA (US); Thomas J. Edsall, Los Gatos, CA (US); Navindra Yadav, Cupertino, CA (US); Francisco M. Matus, Saratoga, CA (US); Krishna Doddapaneni, Sunnyvale, CA (US); Satyam Sinha, Sunnyvale, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/869,310

(22) Filed: Jan. 12, 2018

(65) Prior Publication Data

US 2018/0139124 A1 May 17, 2018

Related U.S. Application Data

(63) Continuation of application No. 14/477,762, filed on Sep. 4, 2014, now Pat. No. 9,876,711.

(Continued)

(51) Int. Cl.
*H04L 12/46* (2006.01)
*H04L 12/741* (2013.01)
(Continued)

(52) U.S. Cl.
CPC .............. *H04L 45/28* (2013.01); *H04L 12/18* (2013.01); *H04L 12/4633* (2013.01);
(Continued)

(58) Field of Classification Search
CPC ..... H04L 12/4633; H04L 45/64; H04L 45/74; H04L 69/22; H04L 49/70; H04L 45/745;
(Continued)

(56) References Cited

U.S. PATENT DOCUMENTS 4,298,770 A 11/1981 Nishihara et al.
4,636,919 A 1/1987 Itakura et al.
(Continued)

FOREIGN PATENT DOCUMENTS

WO 2006/101668 9/2006
WO 2009/115480 9/2009
WO WO 2014/071996 5/2014

OTHER PUBLICATIONS

Cisco Systems, Inc., Cisco Nexus 1000V VXLAN Configuration Guide, Release 4.2(1)SV2(2.1), Chapter 1, Information About VXLANs, Published Jun. 21, 2013, <http://www.cisco.com/c/en/us/td/docs/switches/datacenter/nexus1000/sw/4_2_1_s_v_2_2_1/VXLAN/b_VXLAN_Configuration_4_2_1SV_2_2_1/b_VXLAN_Configuration_4_2_1SV_2_2_1_chapter_01.html#concept_2AB5D746552B49FF8AEBA25CE879DC53>.

(Continued)

*Primary Examiner* — Awet Haile
(74) *Attorney, Agent, or Firm* — Polsinelli PC

(57) ABSTRACT

Systems, methods, and non-transitory computer-readable storage media for translating source addresses in an overlay network. An access switch in an overlay network, such as a VXLAN, may receive an encapsulated packet from a tunnel endpoint in the overlay network. The encapsulated packet may originate from a host associated with the tunnel endpoint and be encapsulated at the tunnel endpoint with a first source tunnel endpoint address and a destination tunnel endpoint address. The access switch may replace the first source tunnel endpoint address in the encapsulated packet with a second source tunnel endpoint address of the access (Continued)

switch to yield a translated packet. The access switch may then transmit the translated packet towards the destination tunnel endpoint address.

20 Claims, 12 Drawing Sheets

Related U.S. Application Data

(60) Provisional application No. 61/900,333, filed on Nov. 5, 2013.

(51) Int. Cl.
  *H04L 12/703* (2013.01)
  *H04L 12/26* (2006.01)
  *H04L 29/12* (2006.01)
  *H04L 12/751* (2013.01)
  *H04L 29/06* (2006.01)
  *H04L 12/58* (2006.01)
  *H04L 29/08* (2006.01)
  *H04L 12/707* (2013.01)
  *H04L 12/709* (2013.01)
  *H04L 12/723* (2013.01)
  *H04L 12/24* (2006.01)
  *H04L 12/931* (2013.01)
  *H04L 12/18* (2006.01)
  *H04L 12/753* (2013.01)
  *H04L 12/743* (2013.01)
  *H04L 12/755* (2013.01)
  *H04L 12/715* (2013.01)
  *H04L 12/803* (2013.01)

(52) U.S. Cl.
  CPC ...... *H04L 12/4641* (2013.01); *H04L 12/4645* (2013.01); *H04L 41/0654* (2013.01); *H04L 43/0811* (2013.01); *H04L 43/0852* (2013.01); *H04L 43/0894* (2013.01); *H04L 43/16* (2013.01); *H04L 45/02* (2013.01); *H04L 45/021* (2013.01); *H04L 45/22* (2013.01); *H04L 45/24* (2013.01); *H04L 45/245* (2013.01); *H04L 45/48* (2013.01); *H04L 45/50* (2013.01); *H04L 45/74* (2013.01); *H04L 45/745* (2013.01); *H04L 45/7453* (2013.01); *H04L 49/70* (2013.01); *H04L 51/14* (2013.01); *H04L 61/2503* (2013.01); *H04L 61/2592* (2013.01); *H04L 67/10* (2013.01); *H04L 69/22* (2013.01); *H04L 45/64* (2013.01); *H04L 47/125* (2013.01); *H04L 2212/00* (2013.01)

(58) Field of Classification Search
  CPC ..... H04L 49/25; H04L 12/46; H04L 2212/00; H04L 47/825; H04L 45/124; H04L 12/4604; H04L 43/00; H04L 45/021; H04L 49/10; Y02B 60/43
  See application file for complete search history.

(56) References Cited

U.S. PATENT DOCUMENTS

| | | |
|---|---|---|
| 4,700,016 A | 10/1987 | Hitchcock et al. |
| 5,115,431 A | 5/1992 | Williams et al. |
| 5,859,835 A | 1/1999 | Varma et al. |
| 5,926,458 A | 7/1999 | Yin et al. |
| 6,230,231 B1 | 5/2001 | DeLong et al. |
| 6,389,031 B1 | 5/2002 | Chao et al. |
| 6,677,831 B1 | 1/2004 | Cheng et al. |
| 6,714,553 B1 | 3/2004 | Poole et al. |
| 6,757,897 B1 | 6/2004 | Shi et al. |
| 6,769,033 B1 | 7/2004 | Bass et al. |
| 6,876,952 B1 | 4/2005 | Kappler et al. |
| 6,907,039 B2 | 6/2005 | Shen |
| 6,941,649 B2 | 9/2005 | Goergen |
| 6,952,421 B1 | 10/2005 | Slater |
| 6,954,463 B1 | 10/2005 | Ma et al. |
| 6,996,099 B1 | 2/2006 | Kadambi et al. |
| 7,068,667 B2 | 6/2006 | Foster et al. |
| 7,152,117 B1 | 12/2006 | Stapp et al. |
| 7,177,946 B1 | 2/2007 | Kaluve et al. |
| 7,372,857 B1 | 5/2008 | Kappler et al. |
| 7,379,459 B2 | 5/2008 | Ohnishi |
| 7,411,915 B1 | 8/2008 | Spain et al. |
| 7,426,604 B1 | 9/2008 | Rygh et al. |
| 7,516,211 B1 | 4/2009 | Gourlay et al. |
| 7,539,131 B2 | 5/2009 | Shen |
| 7,580,409 B1 | 8/2009 | Swenson et al. |
| 7,630,368 B2 | 12/2009 | Tripathi et al. |
| 7,729,296 B1 | 6/2010 | Choudhary |
| 7,742,406 B1 | 6/2010 | Muppala |
| 7,826,469 B1 | 11/2010 | Li et al. |
| 7,940,763 B1 | 5/2011 | Kastenholz |
| 8,190,843 B1 | 5/2012 | de Forest et al. |
| 8,233,384 B2 | 7/2012 | Osterhout et al. |
| 8,302,301 B2 | 11/2012 | Lau |
| 8,325,459 B2 | 12/2012 | Mutnury et al. |
| 8,339,973 B1 | 12/2012 | Pichumani et al. |
| 8,378,223 B1 | 2/2013 | Shiue et al. |
| 8,442,063 B1 | 5/2013 | Zhou et al. |
| 8,514,712 B1 | 8/2013 | Aswadhati |
| 8,687,629 B1 | 4/2014 | Kompella et al. |
| 8,868,766 B1 | 10/2014 | Theimer et al. |
| 8,874,876 B2 | 10/2014 | Bhadra et al. |
| 8,908,691 B2 | 12/2014 | Biswas et al. |
| 9,036,481 B1 | 5/2015 | White |
| 9,053,070 B1 | 6/2015 | Arguelles |
| 9,106,508 B2 | 8/2015 | Banavalikar et al. |
| 9,178,715 B2 | 11/2015 | Jain et al. |
| 9,197,551 B2 | 11/2015 | DeCusatis et al. |
| 9,203,188 B1 | 12/2015 | Siechen et al. |
| 9,258,195 B1 | 2/2016 | Pendleton et al. |
| 9,325,524 B2 | 4/2016 | Banavalikar et al. |
| 9,374,294 B1 | 6/2016 | Pani |
| 9,402,470 B2 | 8/2016 | Shen et al. |
| 9,407,501 B2 | 8/2016 | Yadav et al. |
| 9,426,060 B2 | 8/2016 | Dixon et al. |
| 9,433,081 B1 | 8/2016 | Xiong et al. |
| 9,444,634 B2 | 9/2016 | Pani |
| 9,502,111 B2 | 11/2016 | Dharmapurikar et al. |
| 9,509,092 B2 | 11/2016 | Shen et al. |
| 9,544,185 B1 | 1/2017 | Yadav et al. |
| 9,544,224 B2 | 1/2017 | Chu et al. |
| 9,590,914 B2 | 3/2017 | Attar et al. |
| 9,627,063 B2 | 4/2017 | Dharmapurikar et al. |
| 9,634,846 B2 | 4/2017 | Pani |
| 9,635,937 B2 | 5/2017 | Shen et al. |
| 9,654,300 B2 | 5/2017 | Pani |
| 9,654,385 B2 | 5/2017 | Chu et al. |
| 9,654,409 B2 | 5/2017 | Yadav et al. |
| 9,655,232 B2 | 5/2017 | Saxena et al. |
| 9,667,431 B2 | 5/2017 | Pani |
| 9,667,551 B2 | 5/2017 | Edsall et al. |
| 9,674,086 B2 | 6/2017 | Ma et al. |
| 9,686,180 B2 | 6/2017 | Chu et al. |
| 9,698,994 B2 | 7/2017 | Pani |
| 9,716,665 B2 | 7/2017 | Attar et al. |
| 9,742,673 B2 | 8/2017 | Banerjee et al. |
| 9,755,965 B1 | 9/2017 | Yadav et al. |
| 9,769,078 B2 | 9/2017 | Attar et al. |
| 9,876,715 B2 | 1/2018 | Edsall et al. |
| 2002/0126671 A1 | 9/2002 | Ellis et al. |
| 2002/0136268 A1 | 9/2002 | Gan et al. |
| 2002/0146026 A1 | 10/2002 | Unitt et al. |
| 2003/0035385 A1 | 2/2003 | Walsh et al. |
| 2003/0058837 A1 | 3/2003 | Denney et al. |
| 2003/0058860 A1 | 3/2003 | Kunze et al. |
| 2003/0067924 A1 | 4/2003 | Choe et al. |
| 2003/0097461 A1 | 5/2003 | Barham et al. |
| 2003/0115319 A1 | 6/2003 | Dawson et al. |

(56) References Cited

U.S. PATENT DOCUMENTS

| | | |
|---|---|---|
| 2003/0123462 A1 | 7/2003 | Kusayanagi |
| 2003/0137940 A1 | 7/2003 | Schwartz et al. |
| 2003/0142629 A1 | 7/2003 | Krishnamurthi et al. |
| 2003/0174650 A1 | 9/2003 | Shankar et al. |
| 2003/0223376 A1 | 12/2003 | Elliott et al. |
| 2003/0231646 A1 | 12/2003 | Chandra et al. |
| 2004/0062259 A1 | 4/2004 | Jeffries et al. |
| 2004/0073715 A1 | 4/2004 | Folkes et al. |
| 2004/0100901 A1 | 5/2004 | Bellows |
| 2004/0103310 A1 | 5/2004 | Sobel et al. |
| 2004/0111507 A1 | 6/2004 | Villado et al. |
| 2004/0160956 A1 | 8/2004 | Hardy et al. |
| 2004/0249960 A1 | 12/2004 | Hardy et al. |
| 2005/0007961 A1 | 1/2005 | Scott et al. |
| 2005/0013280 A1 | 1/2005 | Buddhikot et al. |
| 2005/0073958 A1 | 4/2005 | Atlas et al. |
| 2005/0091239 A1 | 4/2005 | Ward et al. |
| 2005/0175020 A1 | 8/2005 | Park et al. |
| 2005/0201375 A1 | 9/2005 | Komatsu et al. |
| 2005/0207410 A1 | 9/2005 | Adhikari et al. |
| 2005/0213504 A1 | 9/2005 | Enomoto et al. |
| 2005/0232227 A1 | 10/2005 | Jorgenson et al. |
| 2006/0028285 A1 | 2/2006 | Jang et al. |
| 2006/0031643 A1 | 2/2006 | Figueira |
| 2006/0075093 A1 | 4/2006 | Frattura et al. |
| 2006/0083179 A1 | 4/2006 | Mitchell |
| 2006/0083256 A1 | 4/2006 | Mitchell |
| 2006/0182036 A1 | 8/2006 | Sasagawa et al. |
| 2006/0183488 A1 | 8/2006 | Billhartz |
| 2006/0198315 A1 | 9/2006 | Sasagawa et al. |
| 2006/0209688 A1 | 9/2006 | Tsuge et al. |
| 2006/0209702 A1 | 9/2006 | Schmitt et al. |
| 2006/0215572 A1 | 9/2006 | Padhye et al. |
| 2006/0215623 A1 | 9/2006 | Lin et al. |
| 2006/0221835 A1 | 10/2006 | Sweeney |
| 2006/0239204 A1 | 10/2006 | Bordonaro et al. |
| 2006/0250982 A1 | 11/2006 | Yuan et al. |
| 2006/0268742 A1 | 11/2006 | Chu et al. |
| 2006/0274657 A1 | 12/2006 | Olgaard et al. |
| 2006/0280179 A1 | 12/2006 | Meier |
| 2006/0285500 A1 | 12/2006 | Booth, III et al. |
| 2007/0016590 A1 | 1/2007 | Appleby et al. |
| 2007/0025241 A1 | 2/2007 | Nadeau et al. |
| 2007/0053303 A1 | 3/2007 | Kryuchkov |
| 2007/0058557 A1 | 3/2007 | Cuffaro et al. |
| 2007/0061451 A1 | 3/2007 | Villado et al. |
| 2007/0076605 A1 | 4/2007 | Cidon et al. |
| 2007/0091795 A1 | 4/2007 | Bonaventure et al. |
| 2007/0097872 A1 | 5/2007 | Chiu |
| 2007/0133566 A1 | 6/2007 | Copps |
| 2007/0159987 A1 | 7/2007 | Khan et al. |
| 2007/0160073 A1 | 7/2007 | Toumura et al. |
| 2007/0211625 A1 | 9/2007 | Liu et al. |
| 2007/0223372 A1 | 9/2007 | Haalen et al. |
| 2007/0233847 A1 | 10/2007 | Aldereguia et al. |
| 2007/0258382 A1 | 11/2007 | Foll et al. |
| 2007/0258383 A1 | 11/2007 | Wada |
| 2007/0274229 A1 | 11/2007 | Scholl et al. |
| 2007/0280264 A1 | 12/2007 | Milton et al. |
| 2008/0031130 A1 | 2/2008 | Raj et al. |
| 2008/0031146 A1 | 2/2008 | Kwak et al. |
| 2008/0031247 A1 | 2/2008 | Tahara et al. |
| 2008/0092213 A1 | 4/2008 | Wei et al. |
| 2008/0147830 A1 | 6/2008 | Ridgill et al. |
| 2008/0151863 A1 | 6/2008 | Lawrence et al. |
| 2008/0177896 A1 | 7/2008 | Quinn et al. |
| 2008/0219173 A1 | 9/2008 | Yoshida et al. |
| 2008/0225853 A1 | 9/2008 | Melman et al. |
| 2008/0243495 A1 | 10/2008 | Anandakumar et al. |
| 2008/0259809 A1 | 10/2008 | Stephan et al. |
| 2008/0259925 A1 | 10/2008 | Droms et al. |
| 2008/0310421 A1 | 12/2008 | Teisberg et al. |
| 2009/0052332 A1 | 2/2009 | Fukuyama et al. |
| 2009/0086629 A1 | 4/2009 | Zhang |
| 2009/0094357 A1 | 4/2009 | Keohane et al. |
| 2009/0103566 A1 | 4/2009 | Kloth et al. |
| 2009/0116402 A1 | 5/2009 | Yamasaki |
| 2009/0122805 A1 | 5/2009 | Epps et al. |
| 2009/0188711 A1 | 7/2009 | Ahmad |
| 2009/0193103 A1 | 7/2009 | Small et al. |
| 2009/0225671 A1 | 9/2009 | Arbel et al. |
| 2009/0232011 A1 | 9/2009 | Li et al. |
| 2009/0238179 A1 | 9/2009 | Samprathi |
| 2009/0268614 A1 | 10/2009 | Tay et al. |
| 2009/0271508 A1 | 10/2009 | Sommers et al. |
| 2010/0128619 A1 | 5/2010 | Shigei |
| 2010/0150155 A1 | 6/2010 | Napierala |
| 2010/0189080 A1 | 7/2010 | Hu et al. |
| 2010/0191813 A1 | 7/2010 | Gandhewar et al. |
| 2010/0191839 A1 | 7/2010 | Gandhewar et al. |
| 2010/0223655 A1 | 9/2010 | Zheng |
| 2010/0260197 A1 | 10/2010 | Martin et al. |
| 2010/0287227 A1 | 11/2010 | Goel et al. |
| 2010/0299553 A1 | 11/2010 | Cen |
| 2010/0312875 A1 | 12/2010 | Wilerson et al. |
| 2011/0007638 A1 | 1/2011 | Zu et al. |
| 2011/0110241 A1 | 5/2011 | Atkinson et al. |
| 2011/0138310 A1 | 6/2011 | Gomez et al. |
| 2011/0158248 A1 | 6/2011 | Vorunganti et al. |
| 2011/0170426 A1 | 7/2011 | Kompella et al. |
| 2011/0203834 A1 | 8/2011 | Yoneya et al. |
| 2011/0213894 A1 | 9/2011 | Silberstein et al. |
| 2011/0228795 A1 | 9/2011 | Agrawal et al. |
| 2011/0249682 A1 | 10/2011 | Kean et al. |
| 2011/0268118 A1 | 11/2011 | Schlansker et al. |
| 2011/0274053 A1 | 11/2011 | Baik et al. |
| 2011/0286324 A1 | 11/2011 | Bellagamba et al. |
| 2011/0286447 A1 | 11/2011 | Liu |
| 2011/0299406 A1 | 12/2011 | Vobbilisetty et al. |
| 2011/0310738 A1 | 12/2011 | Lee et al. |
| 2011/0321031 A1 | 12/2011 | Dournov et al. |
| 2012/0007688 A1 | 1/2012 | Zhou et al. |
| 2012/0063318 A1 | 3/2012 | Boddu et al. |
| 2012/0102114 A1 | 4/2012 | Dunn et al. |
| 2012/0147752 A1 | 6/2012 | Ashwood-Smith et al. |
| 2012/0163396 A1 | 6/2012 | Cheng et al. |
| 2012/0195233 A1 | 8/2012 | Wang et al. |
| 2012/0275304 A1 | 11/2012 | Patel et al. |
| 2012/0281697 A1 | 11/2012 | Huang |
| 2012/0300787 A1 | 11/2012 | Korger |
| 2012/0314581 A1 | 12/2012 | Rajamanickam et al. |
| 2013/0055155 A1 | 2/2013 | Wong et al. |
| 2013/0090014 A1 | 4/2013 | Champion |
| 2013/0097335 A1 | 4/2013 | Jiang et al. |
| 2013/0100810 A1 | 4/2013 | Slothouber |
| 2013/0107889 A1 | 5/2013 | Barabash et al. |
| 2013/0121172 A1 | 5/2013 | Cheng et al. |
| 2013/0124708 A1 | 5/2013 | Lee et al. |
| 2013/0155846 A1 | 6/2013 | Ramachandran et al. |
| 2013/0182712 A1 | 7/2013 | Aguayo et al. |
| 2013/0227108 A1 | 8/2013 | Dunbar et al. |
| 2013/0250951 A1 | 9/2013 | Koganti |
| 2013/0311637 A1 | 11/2013 | Kamath |
| 2013/0311663 A1 | 11/2013 | Kamath et al. |
| 2013/0311991 A1 | 11/2013 | Li et al. |
| 2013/0322258 A1 | 12/2013 | Nedeltchev et al. |
| 2013/0322446 A1 | 12/2013 | Biswas et al. |
| 2013/0322453 A1 | 12/2013 | Allan |
| 2013/0332399 A1 | 12/2013 | Reddy et al. |
| 2013/0332577 A1 | 12/2013 | Nakil et al. |
| 2013/0332602 A1 | 12/2013 | Nakil et al. |
| 2014/0006549 A1 | 1/2014 | Narayanaswamy et al. |
| 2014/0016501 A1 | 1/2014 | Kamath et al. |
| 2014/0043535 A1 | 2/2014 | Motoyama et al. |
| 2014/0043972 A1 | 2/2014 | Li et al. |
| 2014/0047264 A1 | 2/2014 | Wang et al. |
| 2014/0050223 A1 | 2/2014 | Foo et al. |
| 2014/0056298 A1 | 2/2014 | Vobbilisetty et al. |
| 2014/0064278 A1 | 3/2014 | Santos et al. |
| 2014/0064281 A1 | 3/2014 | Basso et al. |
| 2014/0068750 A1 | 3/2014 | Tjahjono et al. |
| 2014/0086253 A1* | 3/2014 | Yong .......... H04L 12/4633 370/395.53 |
| 2014/0105039 A1 | 4/2014 | Mcdysan |

(56) References Cited

U.S. PATENT DOCUMENTS

| | | | |
|---|---|---|---|
| 2014/0105062 A1 | 4/2014 | Mcdysan et al. | |
| 2014/0105216 A1 | 4/2014 | Mcdysan | |
| 2014/0146817 A1* | 5/2014 | Zhang | H04L 45/74 370/392 |
| 2014/0146824 A1 | 5/2014 | Angst et al. | |
| 2014/0201375 A1 | 7/2014 | Beereddy et al. | |
| 2014/0219275 A1 | 8/2014 | Allan et al. | |
| 2014/0241353 A1 | 8/2014 | Zhang et al. | |
| 2014/0244779 A1 | 8/2014 | Roitshtein et al. | |
| 2014/0269705 A1 | 9/2014 | DeCusatis et al. | |
| 2014/0269709 A1* | 9/2014 | Benny | H04L 45/64 370/392 |
| 2014/0269710 A1 | 9/2014 | Sundaram et al. | |
| 2014/0269712 A1 | 9/2014 | Kidambi | |
| 2014/0307744 A1 | 10/2014 | Dunbar et al. | |
| 2014/0321277 A1 | 10/2014 | Lynn, Jr. et al. | |
| 2014/0328206 A1 | 11/2014 | Chan et al. | |
| 2014/0334295 A1 | 11/2014 | Guichard et al. | |
| 2014/0341029 A1 | 11/2014 | Allan et al. | |
| 2014/0372582 A1 | 12/2014 | Ghanwani et al. | |
| 2015/0009992 A1 | 1/2015 | Zhang | |
| 2015/0010001 A1 | 1/2015 | Duda et al. | |
| 2015/0058470 A1 | 2/2015 | Duda | |
| 2015/0073920 A1 | 3/2015 | Pashkevich et al. | |
| 2015/0082418 A1 | 3/2015 | Gu | |
| 2015/0092551 A1 | 4/2015 | Moisand et al. | |
| 2015/0092593 A1 | 4/2015 | Kompella | |
| 2015/0103679 A1 | 4/2015 | Tessmer et al. | |
| 2015/0113143 A1 | 4/2015 | Stuart et al. | |
| 2015/0124590 A1 | 5/2015 | Chu et al. | |
| 2015/0124629 A1 | 5/2015 | Pani | |
| 2015/0124631 A1 | 5/2015 | Edsall et al. | |
| 2015/0124633 A1 | 5/2015 | Banerjee et al. | |
| 2015/0124640 A1 | 5/2015 | Chu et al. | |
| 2015/0124644 A1 | 5/2015 | Pani | |
| 2015/0124806 A1 | 5/2015 | Banerjee et al. | |
| 2015/0124817 A1 | 5/2015 | Merchant et al. | |
| 2015/0124821 A1 | 5/2015 | Chu et al. | |
| 2015/0124822 A1 | 5/2015 | Chu et al. | |
| 2015/0124823 A1 | 5/2015 | Pani et al. | |
| 2015/0124824 A1 | 5/2015 | Edsall et al. | |
| 2015/0124825 A1 | 5/2015 | Dharmapurikar et al. | |
| 2015/0124833 A1 | 5/2015 | Ma et al. | |
| 2015/0127701 A1 | 5/2015 | Chu et al. | |
| 2015/0127797 A1 | 5/2015 | Attar et al. | |
| 2015/0188769 A1 | 7/2015 | Gu | |
| 2015/0222516 A1 | 8/2015 | Deval et al. | |
| 2015/0236900 A1 | 8/2015 | Chung | |
| 2015/0378712 A1 | 12/2015 | Cameron et al. | |
| 2015/0378969 A1 | 12/2015 | Powell et al. | |
| 2016/0036697 A1 | 2/2016 | DeCusatis et al. | |
| 2016/0119204 A1 | 4/2016 | Murasato et al. | |
| 2016/0315811 A1 | 10/2016 | Yadav et al. | |
| 2017/0085469 A1 | 3/2017 | Chu et al. | |
| 2017/0207961 A1 | 7/2017 | Saxena et al. | |
| 2017/0214619 A1 | 7/2017 | Chu et al. | |
| 2017/0237651 A1 | 8/2017 | Pani | |
| 2017/0237678 A1 | 8/2017 | Ma et al. | |
| 2017/0250912 A1 | 8/2017 | Chu et al. | |
| 2017/0346748 A1 | 11/2017 | Attar et al. | |

OTHER PUBLICATIONS

VMware, Inc., VMware Network Virtualization Design Guide, Technical White Paper, Jan. 2013, <http://www.vmware.com/files/pdf/techpaper/Virtual-Network-Design-Guide.pdf>.

Onisick, Joe, "VXLAN Deep Dive," Genesis Framework, Wordpress, Nov. 6, 2012, <http://www.definethecloud.net/vxlan-deep-dive/>/.

International Search Report and Written Opinion for PCT/US2014/063555 dated Feb. 5, 2015.

Aslam, Faisal, et al., "NPP: A Facility Based Computation Framework for Restoration Routing Using Aggregate Link Usage Information," Proceedings of QoS-IP: quality of service in multiservice IP network, Feb. 2005, pp. 150-163.

Chandy, K. Mani, et al., "Distribution Snapshots: Determining Global States of Distributed Systems," ACM Transaction on Computer Systems, Feb. 1985, vol. 3, No. 1, pp. 63-75.

Khasnabish, Bhumip, et al., "Mobility and Interconnection of Virtual Machines and Virtual Network Elements; draft-khasnabish-vmmi-problems-03.txt," Network Working Group, Dec. 30, 2012, pp. 1-29.

Kodialam, Murali, et. al, "Dynamic Routing of Locally Restorable Bandwidth Guaranteed Tunnels using Aggregated Link Usage Information," Proceedings of IEEE INFOCOM, 2001, vol. 1, pp. 376-385.

Li, Li, et. al, "Routing Bandwidth Guaranteed Paths with Local Restoration in Label Switched Networks," IEEE Journal on Selected Areas in Communications, Feb. 7, 2005, vol. 23, No. 2, pp. 1-11.

Mahalingam, M., et al. "VXLAN: A Framework for Overlaying Virtualized Layer 2 Networks over Layer 3 Networks," VXLAN, Internet Engineering Task Force, Internet Draft, located at https://tools.ietf._org/html/draft-mahallngam-dutt-dcops-vxian-06, Oct. 2013, pp. 1-24.

Moncaster, T., et al., "The Need for Congestion Exposure in the Internet", Oct. 26, 2009, Internet-Draft, pp. 1-22.

Narten, T., et al., "Problem Statement: Overlays for Network Virtualization," draft-ietf-nvo3-overlay-problem-statement-04, Internet Engineering Task Force, Jul. 31, 2013, pp. 1-24.

Pan, P., et. al, "Fast Reroute Extensions to RSVP-TE for LSP Tunnels," RFC-4090. May 2005, pp. 1-38.

Raza, Saqib, et al., "Online Routing of Bandwidth Guaranteed Paths with Local Restoration using Optimized Aggregate Usage Information," IEEE-ICC '05 Communications, May 2005, vol. 1, 8 pages.

Sinha, Shan, et al., "Harnessing TCP's Burstiness with Flowlet Switching," Nov. 2004, 6 pages.

* cited by examiner

SOURCE ADDRESS TRANSLATION IN OVERLAY NETWORKS

RELATED APPLICATIONS

This application is a continuation of, and claims priority to, U.S. patent application Ser. No. 14/477,762, filed Sep. 4, 2014, entitled SOURCE ADDRESS TRANSLATION IN OVERLAY NETWORKS, which claims priority to U.S. patent application 61/900,333, filed Nov. 5, 2013, entitled EXPLICIT CONGESTION NOTIFICATION IN AN OVERLAY NETWORK, the contents of which are expressly incorporated herein by reference in their entireties.

TECHNICAL FIELD

The present technology pertains to overlay networks, and more specifically pertains to address translations in overlay networks.

BACKGROUND

Overlay network technologies, such as Virtual Extensible Local Area Networks (VXLANs), offer a highly scalable solution to managing cloud computing deployments by allowing OSI layer 2 networks to expand beyond layer 3 network boundaries through network virtualization. Layer 2 data traffic, such as Media Access Control (MAC) Ethernet frames, can be encapsulated within layer 3 packets, such as User Datagram Protocol (UDP) packets, to travel across layer 3 boundaries to reach its destination within the overlay network.

Various tunnel endpoints within the overlay network, such as Virtual Tunnel Endpoints (VTEPs), can terminate overlay network packets by encapsulating and de-encapsulating packets through MAC-to-UDP encapsulation. Each tunnel endpoint may be provided with a unique IP/MAC address pair to make the encapsulation and routing encapsulated packets within the overlay network possible. In addition, all the tunnel endpoint IP addresses in the overlay network may need to be stored in lookup tables at every one of those tunnel endpoints so that those tunnel endpoints can determine where to transmit encapsulated traffic. However, as the number of tunnel endpoints in a given overlay network increases, these tables also need to scale linearly, which can consume a large amount of resources at the tunnel endpoints.

Maintaining a large number of lookup or routing tables can be a challenge when new endpoints, such as servers and virtual machines (VMs), are added to the overlay network, existing endpoints are removed from the network, or some of the endpoints migrate from one tunnel endpoint to another within the network. Whenever such changes occur in the network topology, many if not all lookup tables residing in tunnel endpoints throughout the overlay network may require an update, a modification, or a synchronization. This can pose a great challenge particularly in a large cloud computing environment where there are numerous virtual domains, virtual networks, and endpoints.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
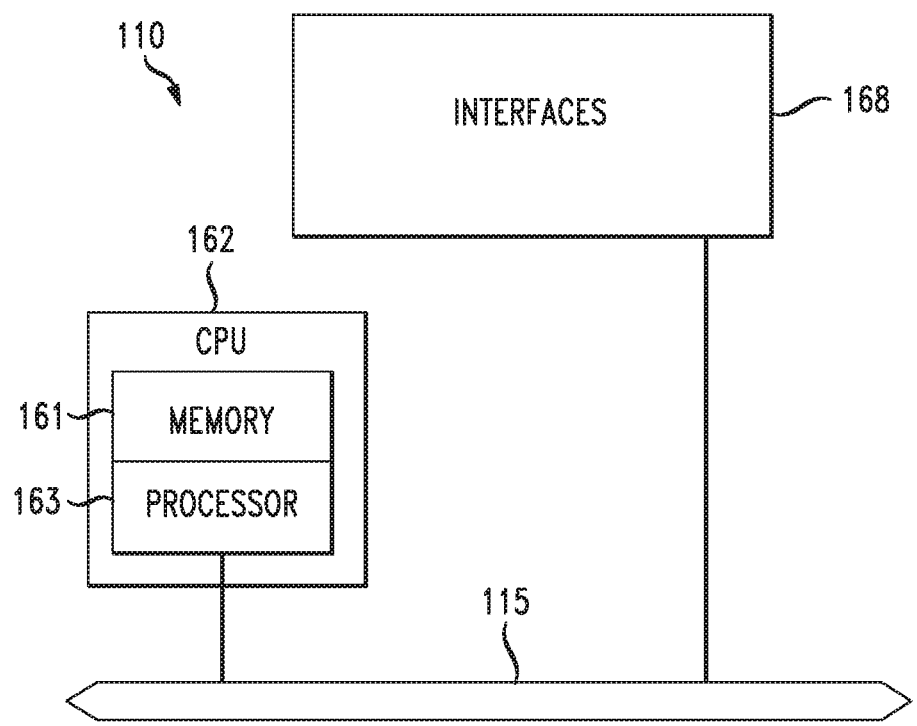
FIG. 1 illustrates an example network device according to some aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Systems, methods, and computer-readable storage devices are disclosed which address the issues raised above regarding storing tunnel endpoint addresses in lookup tables. According to the various embodiments disclosed herein, an access switch in an overlay network can receive an encapsulated packet from a tunnel endpoint in the same overlay network. The encapsulated packet may have originated from a host behind the tunnel endpoint. The packet may have been encapsulated at the tunnel endpoint with a source tunnel endpoint address of the tunnel endpoint and a destination tunnel endpoint address.

The access switch can translate the encapsulated packet and its source tunnel endpoint address by replacing the source tunnel endpoint address in the encapsulated packet with the tunnel endpoint address of the access switch. Subsequently, the access switch may transmit the translated packet towards the destination tunnel endpoint address.

The proposed methods use the access switch to proxy for tunnel endpoints that are below it, such that only the tunnel endpoint address of the access switch would need to be stored at other tunnel endpoints' lookup tables. These methods may advantageously reduce the number of encapsulation information needed at tunnel endpoints, reduce the amount of host movements updates needed at tunnel endpoints, and can be implemented in access switch hardware with low hardware cost.

DESCRIPTION

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the intel or extel network.

Network segments, such as physical or virtual segments; networks; devices; ports; physical or logical links; and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

The disclosed technology addresses the need in the art for translating tunnel endpoint addresses in overlay networks. Disclosed are systems, methods, and computer-readable storage media for receiving an encapsulated packet from a tunnel endpoint, translating the encapsulated packet and its tunnel endpoint address, and replacing transmitting the translated packet to the destination tunnel endpoint. A brief introductory description of example systems and networks, as illustrated in FIGS. 1 through 4, is disclosed herein. A detailed description of source address translation, related concepts, and example variations, will then follow. These variations shall be described herein as the various embodiments are set forth. The disclosure now turns to FIG. 1.

FIG. 1 illustrates an example network device 110 suitable for implementing the present invention. Network device 110 includes master central processing unit (CPU) 162, interfaces 168, and bus 115 (e.g., a PCI bus). When acting under the control of appropriate software or firmware, CPU 162 is responsible for executing packet management, error detection, and/or routing functions, such as miscabling detection functions, for example. CPU 162 preferably accomplishes all these functions under the control of software including an operating system and any appropriate applications software. CPU 162 may include one or more processors 163 such as a processor from the Motorola family of microprocessors or the MIPS family of microprocessors. In an aletive embodiment, processor 163 is specially designed hardware for controlling the operations of router 110. In a specific embodiment, memory 161 (such as non-volatile RAM and/ or ROM) also forms part of CPU 162. However, there are many different ways in which memory could be coupled to the system.

Interfaces 168 are typically provided as interface cards (sometimes referred to as "line cards"). Generally, they control the sending and receiving of data packets over the network and sometimes support other peripherals used with the router 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow master microprocessor 162 to efficiently perform routing computations, network diagnostics, security functions, etc.

Although the system shown in FIG. 1 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 2A:
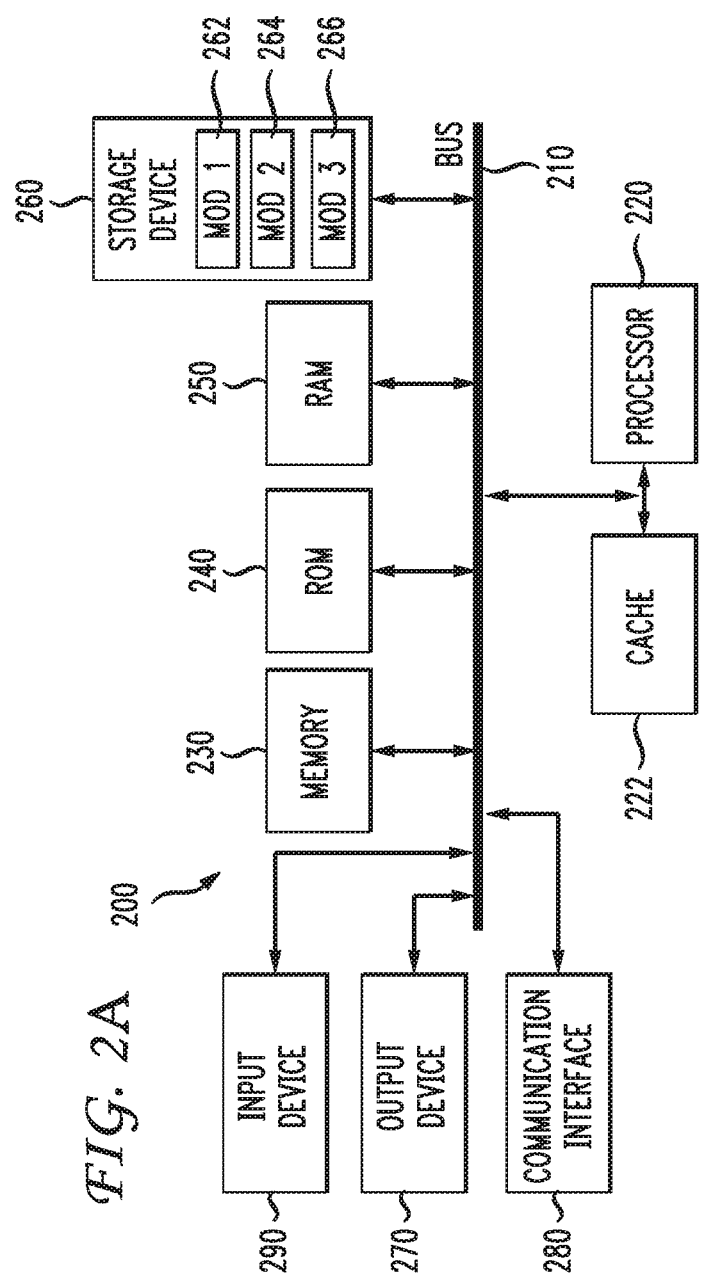
FIGS. 2A-B illustrate example system embodiments according to some aspects of the subject technology.
Figure 2B:
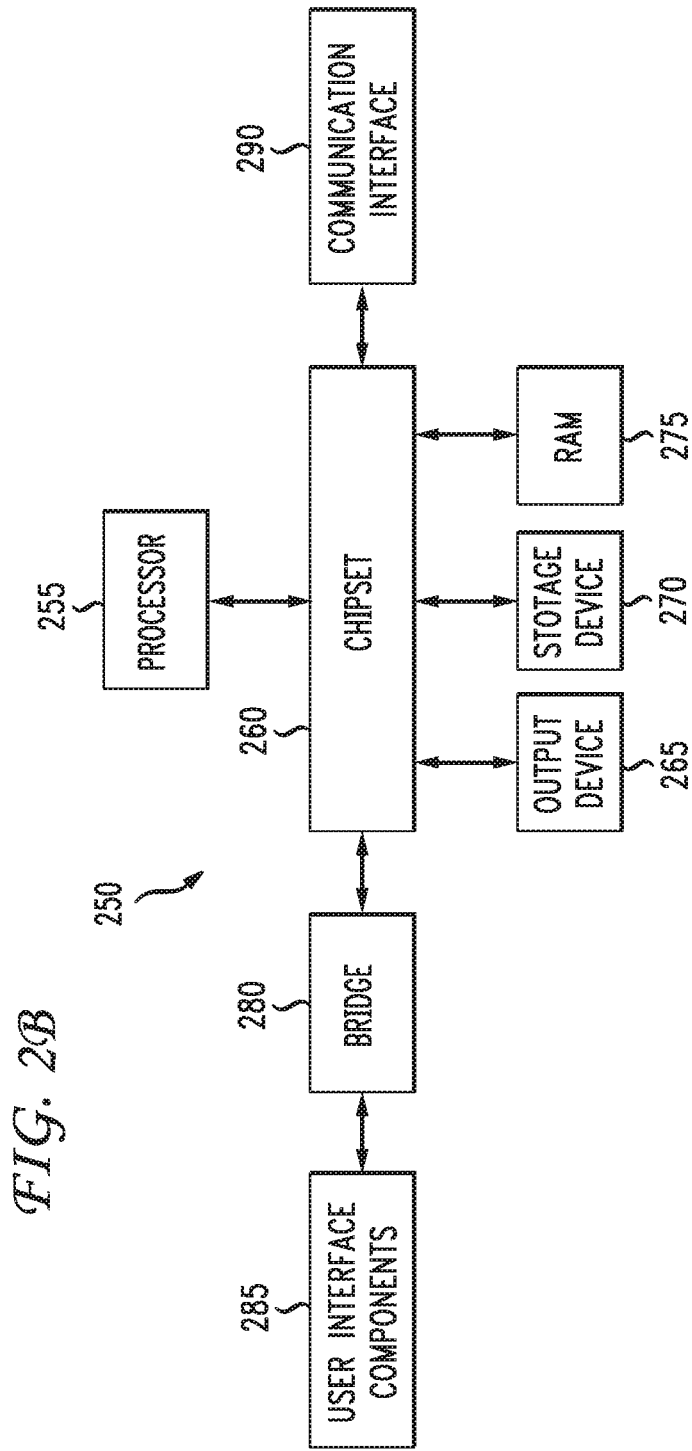

FIG. 2A and FIG. 2B illustrate example system embodiments. The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using a bus 205. Example system 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 (232), module 2 (234), and module 3 (236) stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech and so forth. An output device 235 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, display 235, and so forth, to carry out the function.

FIG. 2B illustrates a computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. In this example, chipset 260 outputs information to output 265, such as a display, and can read and write information to storage device 270, which can include magnetic media, and solid state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or 275. Further, the machine can receive inputs from a user via user interface components 285 and execute appropriate functions, such as browsing functions by interpreting these inputs using processor 255.

It can be appreciated that example systems 200 and 250 can have more than one processor 210 or be part of a group or cluster of computing devices networked together to provide greater processing capability.

Figure 3:
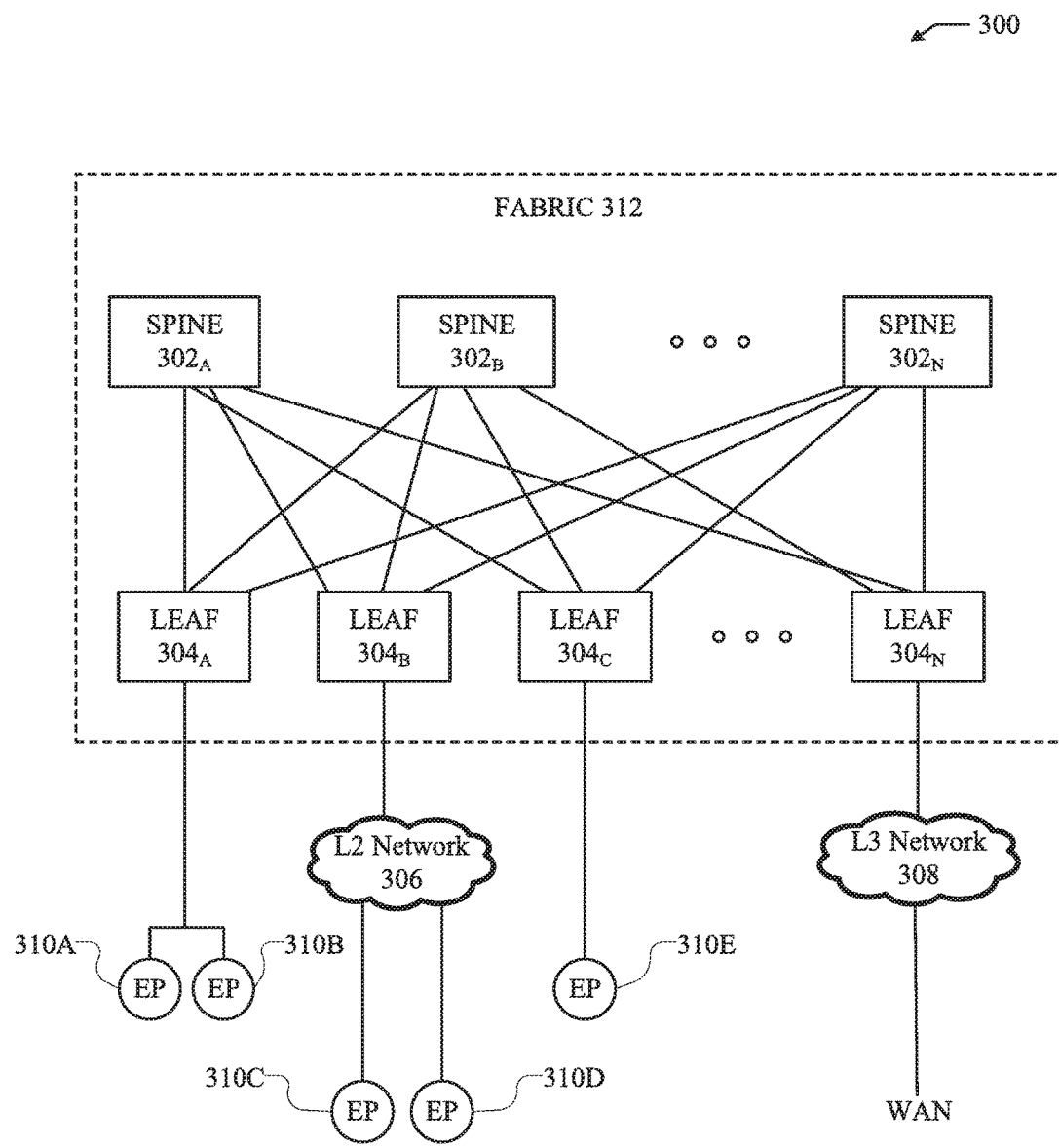
FIG. 3 illustrates a schematic block diagram of an example architecture for a network fabric.

FIG. 3 illustrates a schematic block diagram of an example architecture 300 for a network fabric 312. Network fabric 312 can include spine switches $302_A$, $302_B$, ..., $302_N$ (collectively "302") connected to leaf switches $304_A$, $304_B$, $304_C$, ..., $304_N$ (collectively "304") in network fabric 312.

Spine switches 302 can be L3 switches in fabric 312. However, in some cases, spine switches 302 can also, or otherwise, perform L2 functionalities. Further, spine switches 302 can support various capabilities, such as 40 or 10 Gbps Ethernet speeds. To this end, spine switches 302 can include one or more 40 Gigabit Ethernet ports. Each port can also be split to support other speeds. For example, a 40 Gigabit Ethernet port can be split into four 10 Gigabit Ethernet ports.

In some embodiments, one or more of spine switches 302 can be configured to host a proxy function that performs a lookup of the endpoint address identifier to locator mapping in a mapping database on behalf of leaf switches 304 that do not have such mapping. The proxy function can do this by parsing through the packet to the encapsulated, tenant packet to get to the destination locator address of the tenant. Spine switches 302 can then perform a lookup of their local mapping database to determine the correct locator address of the packet and forward the packet to the locator address without changing certain fields in the header of the packet.

When a packet is received at spine switch $302_i$, spine switch $302_i$ can first check if the destination locator address is a proxy address. If so, spine switch $302_i$ can perform the proxy function as previously mentioned. If not, spine switch $302_i$ can lookup the locator in its forwarding table and forward the packet accordingly.

Spine switches 302 connect to leaf switches 304 in fabric 312. Leaf switches 304 can include access ports (or non-fabric ports) and fabric ports. Fabric ports can provide uplinks to spine switches 302, while access ports can provide connectivity for devices, hosts, endpoints, VMs, or extel networks to fabric 312.

Leaf switches 304 can reside at the edge of fabric 312, and can thus represent the physical network edge. In some cases, leaf switches 304 can be top-of-rack (ToR) switches configured according to a ToR architecture. In other cases, leaf switches 304 can be aggregation switches in any particular topology, such as end-of-row (EoR) or middle-of-row (MoR) topologies. The leaf switches 304 can also represent aggregation switches, for example. In some embodiments, spine switches 302 and leaf switches 304 can be arranged in a Clos network topology. In other embodiments, spine switches 302 and leaf switches 304 can be arranged in a fat tree network topology.

The leaf switches 304 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 304 can contain virtual switching functionalities, such as a virtual tunnel endpoint (VTEP) function as explained below in the discussion of VTEP 408 in FIG. 4. To this end, leaf switches 304 can connect the fabric 312 to an overlay network, such as overlay network 400 illustrated in FIG. 4.

Network connectivity in the fabric 312 can flow through the leaf switches 304. Here, the leaf switches 304 can provide servers, resources, endpoints, external networks, or VMs access to the fabric 312, and can connect the leaf switches 304 to each other. In some cases, the leaf switches 304 can connect EPGs to the fabric 312 and/or any external networks. Each EPG can connect to the fabric 312 via one of the leaf switches 304, for example.

Endpoints 310A-E (collectively "310") can connect to the fabric 312 via leaf switches 304. For example, endpoints 310A and 310B can connect directly to leaf switch 304A, which can connect endpoints 310A and 310B to the fabric 312 and/or any other one of the leaf switches 304. Similarly, endpoint 310E can connect directly to leaf switch 304C, which can connect endpoint 310E to the fabric 312 and/or any other of the leaf switches 304. On the other hand, endpoints 310C and 310D can connect to leaf switch 304B via L2 network 306. Similarly, the wide area network (WAN) can connect to the leaf switches 304C or 304D via L3 network 308.

Endpoints 310 can include any communication device, such as a computer, a server, a switch, a router, etc. In some cases, the endpoints 310 can include a server, hypervisor, or switch configured with a VTEP functionality which connects an overlay network, such as overlay network 400 below, with the fabric 312. For example, in some cases, endpoints 310 can represent one or more of the VTEPs 408A-D illustrated in FIG. 4. Here, the VTEPs 408A-D can connect to the fabric 312 via the leaf switches 304. The overlay network can host physical devices, such as servers, applications, EPGs, virtual segments, virtual workloads, etc. In addition, the endpoints 310 can host virtual workload(s), clusters, and applications or services, which can connect with the fabric 312 or any other device or network, including an external network. For example, one or more endpoints 310 can host, or connect to, a cluster of load balancers or an EPG of various applications.

Although the fabric 312 is illustrated and described herein as an example leaf-spine architecture, one of ordinary skill in the art will readily recognize that the subject technology can be implemented based on any network fabric, including any data center or cloud network fabric. Indeed, other architectures, designs, infrastructures, and variations are contemplated herein.

Figure 4:
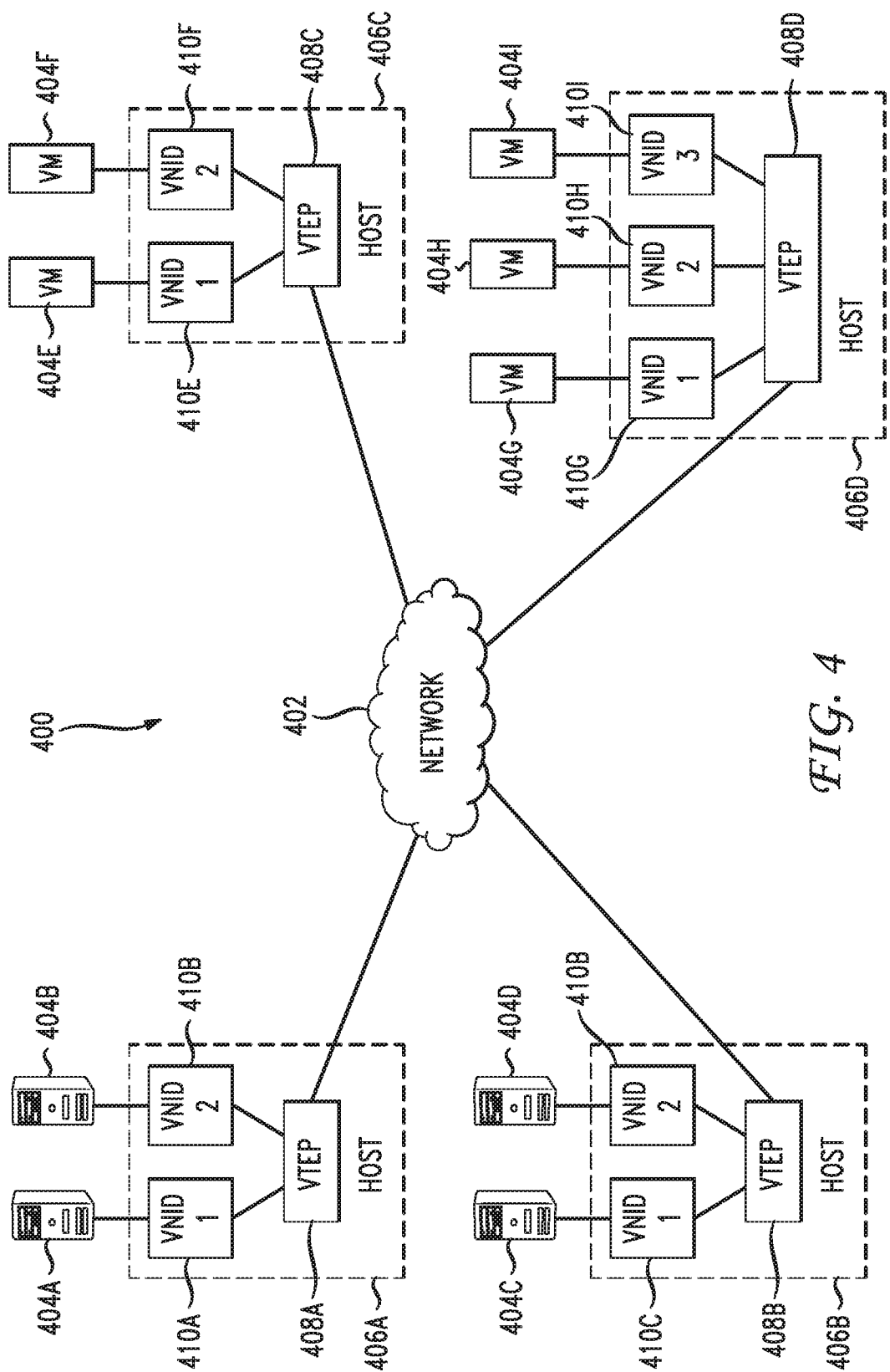
FIG. 4 illustrates an example overlay network.

FIG. 4 illustrates an example overlay network 400. Overlay network 400 uses an overlay protocol, such as VXLAN, NVGRE, VO3, or STT, to encapsulate traffic in L2 and/or L3 packets which can cross overlay L3 boundaries in the network. As illustrated in FIG. 4, overlay network 400 can include hosts 406A-D interconnected via network 402.

Network 402 can include a packet network, such as an IP network, for example. Moreover, network 402 can connect the overlay network 400 with the fabric 312 in FIG. 3. For example, VTEPs 408A-D can connect with the leaf switches 304 in the fabric 312 via network 402.

Hosts 406A-D include virtual tunnel end points (VTEP) 408A-D, which can be virtual nodes or switches configured to encapsulate and de-encapsulate data traffic according to a specific overlay protocol of the network 400, for the various virtual network identifiers (VNIDs) 410A-I. Each host 406A-D can be a Virtual Ethernet Module (VEM) that is assigned at least one IP address used as the source IP address when the encapsulated MAC frames are sent to other VEMs over the network. Moreover, hosts 406A-D can include servers containing a VTEP functionality, hypervisors, and physical switches, such as L3 switches, configured with a VTEP functionality. For example, hosts 406A and 406B can be physical switches configured to run VTEPs 408A-B. Here, hosts 406A and 406B can be connected to servers 404A-D, which, in some cases, can include virtual workloads through VMs loaded on the servers, for example.

In some embodiments, network 400 can be a VXLAN network, and VTEPs 408A-D can be VXLAN tunnel end points. However, as one of ordinary skill in the art will readily recognize, network 400 can represent any type of overlay or software-defined network, such as NVGRE, STT, or even overlay technologies yet to be invented.

The VNIDs can represent the segregated virtual networks in overlay network 400. In some embodiments where network 400 may be a VXLAN network, VNIDs can be VXLAN IDs that are used to segment and identify virtual networks. Each of the overlay tunnels (VTEPs 408A-D) can include one or more VNIDs. For example, VTEP 408A can include VNIDs 1 and 2, VTEP 408B can include VNIDs 1 and 3, VTEP 408C can include VNIDs 1 and 2, and VTEP 408D can include VNIDs 1-3. As one of ordinary skill in the art will readily recognize, any particular VTEP can, in other embodiments, have numerous VNIDs, including more than the 3 VNIDs illustrated in FIG. 4.

The traffic in overlay network 400 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Servers 404A-D and VMs 404E-I can connect to their respective VNID or virtual segment, and communicate with other servers or VMs residing in the same VNID or virtual segment. For example, server 404A can communicate with server 404C and VMs 404E and 404G because they all reside in the same VNID, viz., VNID 1. Similarly, server 404B can communicate with VMs 404F, 404H because they all reside in VNID 2. VMs 404E-I can host virtual workloads, which can include application workloads, resources, and services, for example. However, in some cases, servers 404A-D can similarly host virtual workloads through VMs hosted on the servers 404A-D. In this regard, various endpoints such as servers 404A-D and VMs 404E-I may be also referred to as hosts. Moreover, each of the servers 404A-D and VMs 404E-I can represent a single server or VM, but can also represent multiple servers or VMs, such as a cluster of servers or VMs.

VTEPs 408A-D can encapsulate packets directed at the various VNIDs 1-3 in the overlay network 400 according to the specific overlay protocol implemented, such as VXLAN, so traffic can be properly transmitted to the correct VNID and recipient(s). Moreover, when a switch, router, or other network device receives a packet to be transmitted to a recipient in the overlay network 400, it can analyze a routing table, also known as a lookup table or an encapsulation table, to determine where such packet needs to be transmitted so the traffic reaches the appropriate recipient. For example, if VTEP 408A receives a packet from endpoint 404B that is intended for endpoint 404H, VTEP 408A can analyze a routing table that maps the intended endpoint, endpoint 404H, to a specific switch that is configured to handle communications intended for endpoint 404H. VTEP 408A might not initially know, when it receives the packet from endpoint 404B, that such packet should be transmitted to VTEP 408D in order to reach endpoint 404H. Accordingly, by analyzing the routing table, VTEP 408A can lookup endpoint 404H, which is the intended recipient, and determine that the packet should be transmitted to VTEP 408D, as specified in the routing table based on endpoint-to-switch mappings or bindings, so the packet can be transmitted to, and received by, endpoint 404H as expected.

However, continuing with the previous example, in many instances, VTEP 408A may analyze the routing table and fail to find any bindings or mappings associated with the intended recipient, e.g., endpoint 404H. Here, the routing table may not yet have learned routing information regarding endpoint 404H. In this scenario, the VTEP 408A may likely broadcast or multicast the packet to ensure the proper switch associated with endpoint 404H can receive the packet and further route it to endpoint 404H.

In some cases, the routing table can be dynamically and continuously modified by removing unnecessary or stale entries and adding new or necessary entries, in order to maintain the routing table up-to-date, accurate, and efficient, while reducing or limiting the size of the table.

As one of ordinary skill in the art will readily recognize, the examples and technologies provided above are simply for clarity and explanation purposes, and can include many additional concepts and variations.

Figure 5:
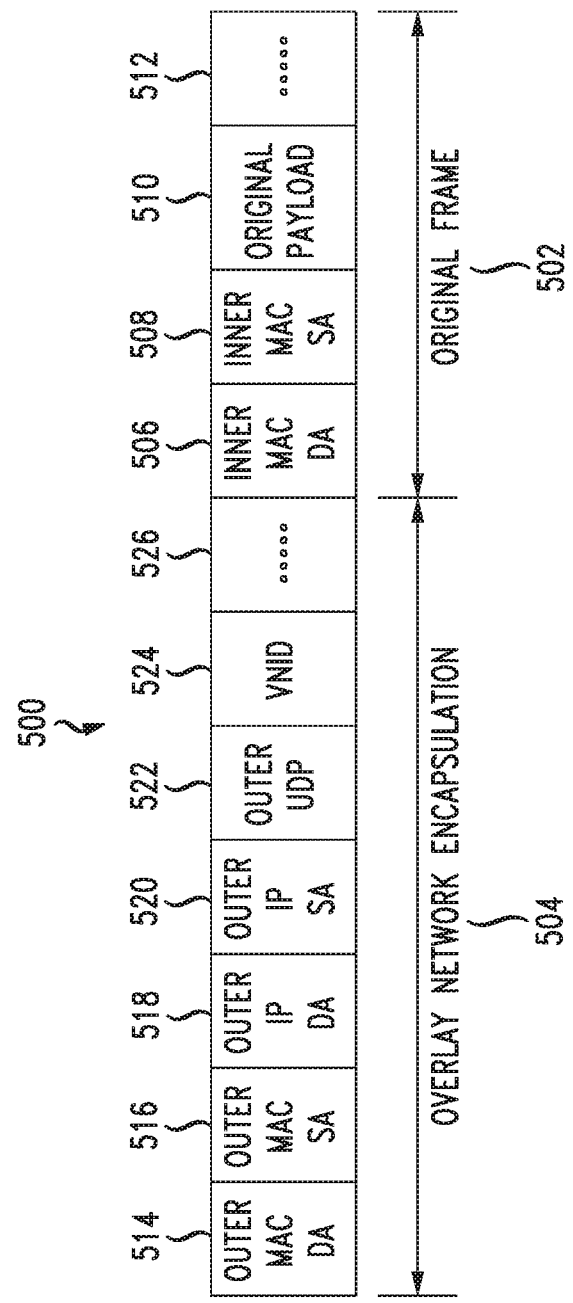
FIG. 5 illustrates an example layout of an encapsulated packet.

FIG. 5 illustrates an example layout of an encapsulated packet. Encapsulated packet 500, such as a VXLAN encapsulated packet, may consist of original frame 502 combined with overlay network encapsulation 504. Overlay network encapsulation 504 can be a header. Both original frame 502 and overlay network encapsulation header 504 may consist of component data segments or bits 506-526. However, one of ordinary skill in the art will recognize that the exact layout of the packet may differ from the example layout 500 as shown in FIG. 5. For example, data segments 506-526 may be rearranged in a different order, one or more example data segments 506-526 may be omitted, and/or other data segment(s) not shown in FIG. 5 may be added to layout 500. Original frame 502 may be an L2 packet such as an Ethernet frame. It may have original payload 510, which represents the actual data that the packet is tasked with transmitting from one node to another node in the network. In an Ethernet packet, original payload 510 would be an original Ethernet payload. Original frame 502 may include inner host destination address 506 and inner host source address 508, which may respectively represent layer 2 addresses, such as MAC addresses, of the destination and source hosts (i.e., endpoints). Original frame 502 may also contain other data 512 such as cyclic redundancy check (CRC) code or optional inner packet data according to the Institute of Electrical and Electronics Engineers (IEEE) 802.1Q standards.

Original frame 502 can be encapsulated at a tunnel endpoint, such as VTEPs 408A-408D as shown in FIG. 4, with overlay network encapsulation header 504. After traversing the overlay network with a help of the information contained in overlay network encapsulation header 504, encapsulated packet 500 can then be de-encapsulated at another tunnel endpoint. Overlay network encapsulated packet 500 may be treated as a L3 packet, such as a User Datagram Protocol (UDP) packet. Overlay network encapsulation header 504 may contain one or more data segments, such as outer host destination address 514, outer host source address 516, outer IP destination address 518, outer IP source address 520, outer UDP 522, VNID 524, and other data 526. Outer host destination address 514 may be an L2 address, such as a MAC address, for the destination tunnel endpoint (e.g., VTEP). Similarly, outer host source address 516 may be an L2 address, such as a MAC address, for the source tunnel endpoint that encapsulated overlay network encapsulated packet 500. Outer IP destination address 518 may be an L3 address, such as an IP address, attached to the destination tunnel endpoint. By the same token, outer IP source address 520 may represent the L3 address, such as the IP address, for the source tunnel endpoint where packet 500 was encapsulated.

Outer UDP 522 may contain information pertaining to a specific L3 protocol (e.g., UDP), such as a source port number, a destination port number, a length, a checksum, etc. However, one of ordinary skill in the art will readily recognize that data necessary for other types of protocols, such as TCP, may also be included depending on what type of overlay network the encapsulated packet is deployed in. VNID 524 may include information about which segregated virtual network in the overlay network the encapsulated packet pertains to. For example, in a VXLAN network, VNID 526 can be a 24-bit VXLAN ID. Other data 526 can be included in encapsulated packet 500 such as outer IEEE 802.1Q data.

Figure 6:
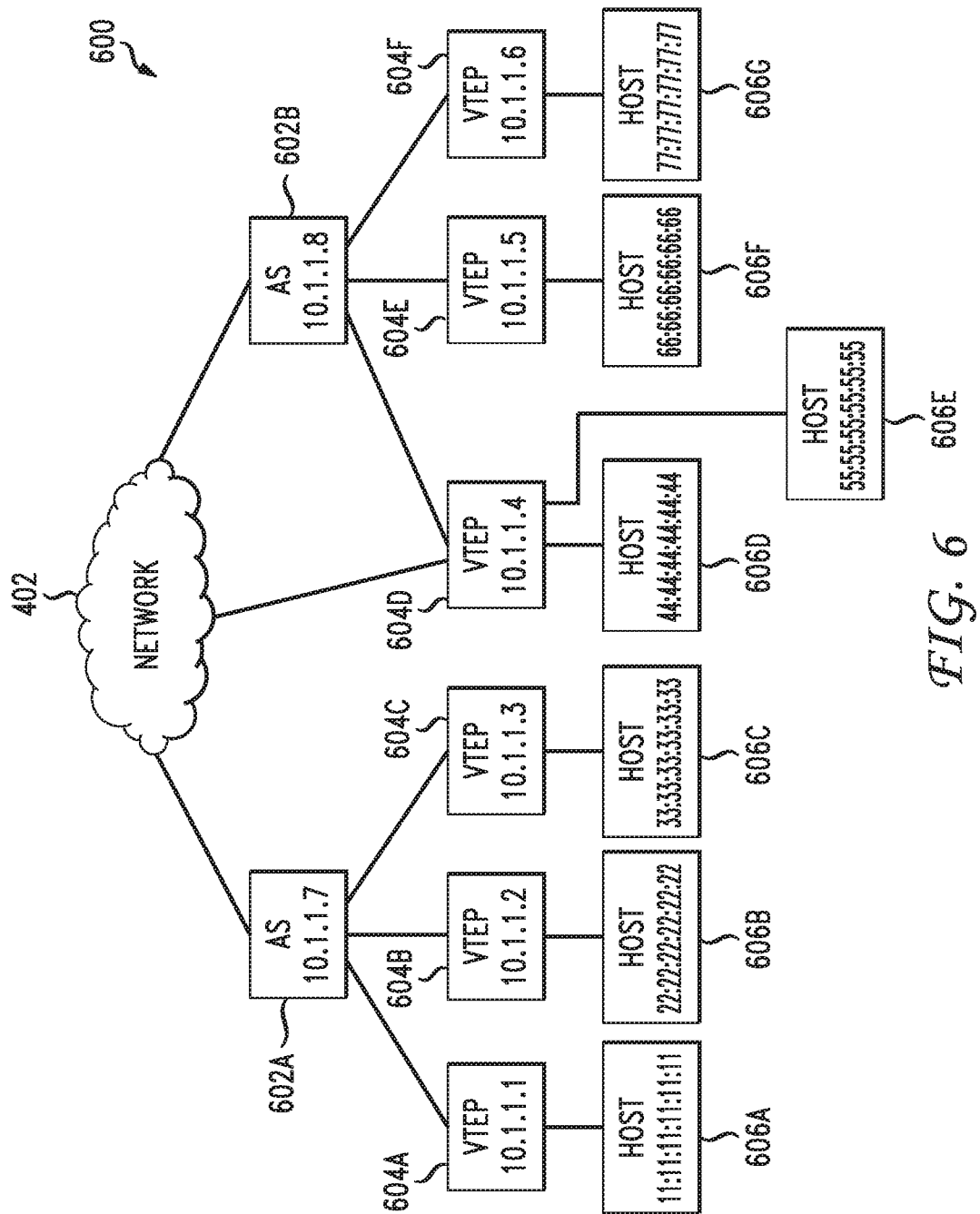
FIG. 6 illustrates a schematic block diagram of an example overlay network with access switches functioning as proxies for tunnel endpoints.

FIG. 6 illustrates a schematic block diagram of example overlay network 600 with access switches 602A, 602B functioning as proxies for tunnel endpoints 604A, 604B, 604C, 604E, 604F. In some embodiments, access switches 602A, 602B can be a physical switch. In other embodiments, access switches 602A, 602B can be a virtual or logical switch residing on a physical device. Access switches 602A, 602B may be a ToR switch. Access switches 602A, 602B can be connected, via their front panel ports, to one or more tunnel endpoints 604A, 604B, 604C, 604E, 604F, and function as proxies for those tunnel endpoints 604A, 604B, 604C, 604E, 604F. Moreover, access switches 602A, 602B themselves may have a VTEP capability and have their tunnel endpoint addresses. For example, access switch 602A may proxy for VTEPs 604A, 604B, 604C. The example IP addresses for VTEPs 604A, 604B, 604C are 10.1.1.1, 10.1.1.2, 10.1.1.3, and access switch 602A has its own IP address, 10.1.1.7. Similarly, in example overlay network 600, access switch 602B with IP address 10.1.1.8 functions as a proxy for VTEP 604E with IP address 10.1.1.5 and VTEP 604F with IP address 10.1.1.6. Some VTEPs such as VTEP 604D may not be behind an access switch, and such VTEP 604D can route messages to other access switches 602A, 602B or VTEPs. VTEPs 604A-604F, in turn, may be connected to one or more endpoints or hosts 606A-606G with VNIDs (not shown in FIG. 6) and L2 addresses such as MAC addresses. Hosts 606A-606G can be servers, VMs, terminals, clusters, etc.

As will be discussed in detail below, access switches 602A, 602B may take ownership of the outbound encapsulated packets by replacing the source tunnel endpoint addresses in the encapsulated packets with their own tunnel endpoint addresses. For example, access switch 602A can rewrite the source tunnel address field, such as outer IP SA 520 data segment of encapsulated packet 500 shown in FIG. 5, by inserting the IP address for access switch 602A (i.e., 10.1.1.7) to any of the encapsulated packets originating from hosts 606A-606C and encapsulated at VTEPs 604A-604C.

Subsequently, by the time the packets, each originating from one of hosts 606A-606C and encapsulated at one of VTEPs 604A-604C, pass through access switch 602A and arrive at other VTEP 604D or access point 602B, the source tunnel endpoint address in those packets may only show up the IP address of access switch 602A (i.e., 10.1.1.7), instead of their original source tunnel endpoint addresses such as 10.1.1.1, 10.1.1.2, or 10.1.1.3. Thus, once the source address translation takes place, the rest of the network fabric may see the end points below access switch 602A as being attached to one tunnel endpoint, even though they may actually have their outbound packets encapsulated at VTEPs 604A-604C below proxy switch 602A.

As proxies, access switches 602A, 602B can maintain the forwarding information for all the hosts that are reachable via their front panel ports. The forwarding information may be stored in a routing table, a lookup table, or an encapsulation table. In some embodiments, access switch 602A may maintain separate lookup tables for inbound traffic and outbound traffic, while in other embodiments, access switch 602A may use the same lookup table for both inbound and outbound traffic. Access switch 602A may also keep separate lookup tables for different VNIDs instead of having a combined table for all the VNIDs.

Figure 7:
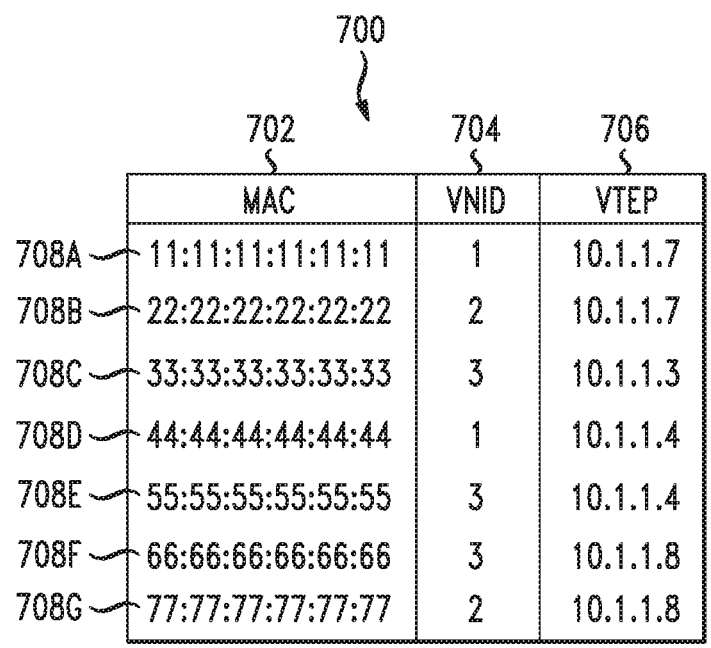
FIG. 7 illustrates an example encapsulation table.

FIG. 7 illustrates example encapsulation table 700 as used by tunnel endpoint 604C of FIG. 6 for encapsulating outbound packets. Encapsulation table 700, also known as a routing table or a lookup table, may contain host address field 702, VNID field 704, and tunnel endpoint address field 706. One of ordinary skill in the art will readily recognize that encapsulation table 700 can contain more information or less information than what is presented in FIG. 7. Host address field 702 may represent L2 addresses, such as MAC addresses, for endpoints in the overlay network. In addition, VNID field 704 may present the identifiers of the virtual networks, such as VXLANs, to which the endpoints are assigned. Furthermore, tunnel endpoint address field 706 may list corresponding L3 addresses, such as IP addresses, that are associated with the hosts.

For instance, if VTEP 604C is to encapsulate a packet (e.g., L2 data frame) that is destined for host 606F, VTEP 604C can extract the destination host address, such as inner MAC DA 506 as shown in FIG. 5, from the packet, and look up that address in encapsulation table 700. Example lookup entry 708F in encapsulation table 700 indicates that the destination host address 66:66:66:66:66:66 is linked to VNID of 3 and VTEP address of 10.1.1.8. Therefore, VTEP 604C may insert the IP address 10.1.1.8 in the destination tunnel endpoint address field, such as outer IP DA 518 as shown in FIG. 5, of the encapsulation header.

Notice that VTEP addresses 706 for hosts 606F, 606G appear on example encapsulation table 700 as 10.1.1.8 (708F, 708G), which is the tunnel endpoint address associated with access switch 602B, instead of 10.1.1.5 or 10.1.1.6, which corresponds to VTEP 604E and VTEP 604F respectively, because VTEPs 604E, 604F are located behind access switch 602B and therefore hidden from VTEP's 604C view in example overlay network 600. Notice also that VTEP addresses 706 in encapsulation table 700 for the VTEPs that are behind an access switch (e.g., VTEPs 604E, 604F) may be indistinguishable from the VTEP addresses for those VTEPs that are not behind an access switch (e.g., VTEP 604D). In other words, from the standpoint of VTEP 604C, hosts 606F, 606G may simply appear as though they are behind a single VTEP, not unlike how hosts 606D, 606E may appear to VTEP 604C. VTEP 604C may not be able to determine whether a given host is behind a proxy tunnel endpoint or not, just by examining encapsulation table 700.

Optionally, encapsulation table 700 used by VTEP 604C may also contain a lookup entry for host 606C that is attached to VTEP 604C (708C) and entries for hosts 606A, 606B that are attached to other VTEPs 604A, 604B behind the same access switch 602A as VTEP 604C (708A, 708B). These lookup entries may be helpful for routing packets within VTEP and/or access switch boundaries or providing additional network features such as security enforcement, service redirect, etc.

Figure 8:
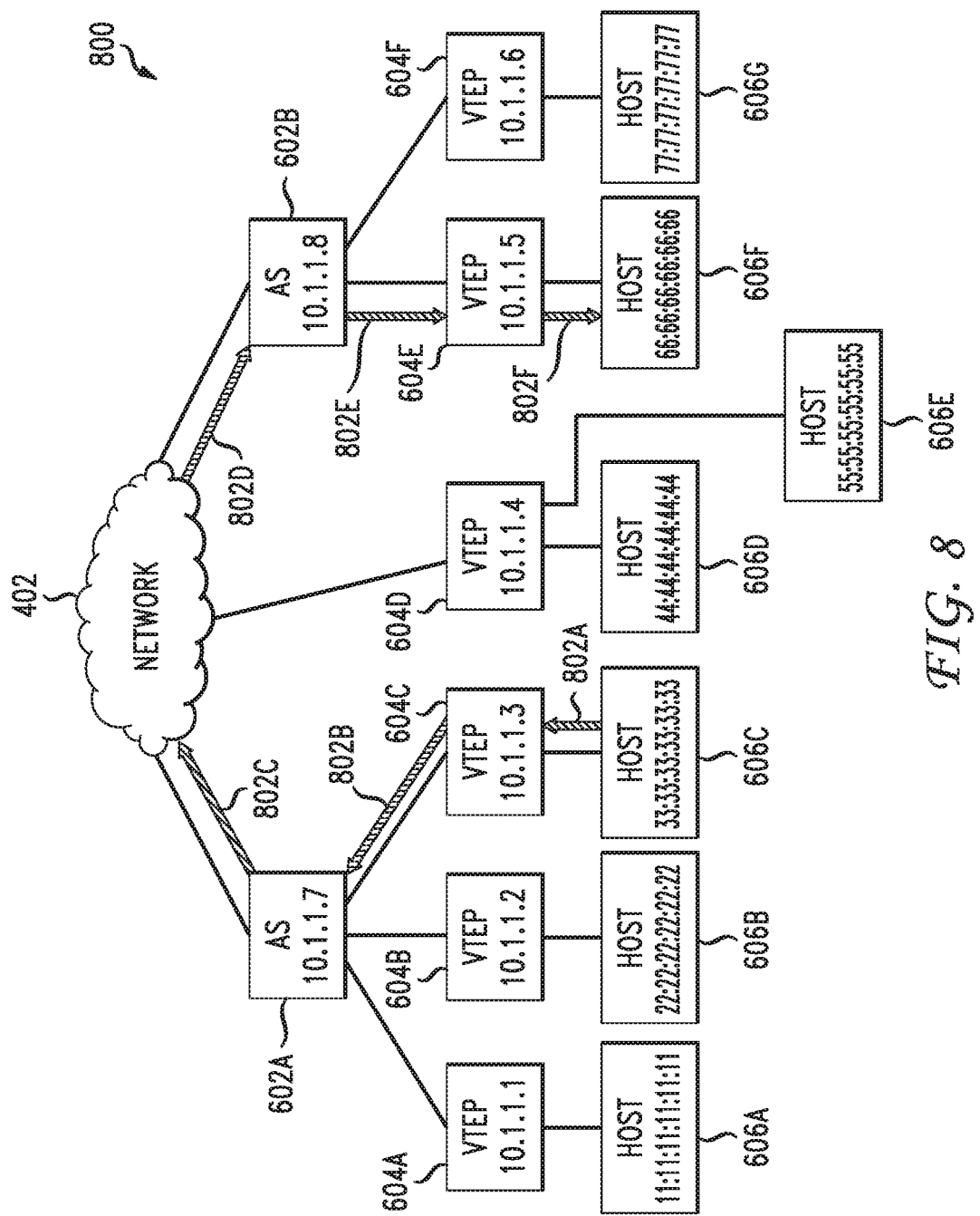
FIG. 8 illustrates a schematic block diagram of an example overlay network with source address translation.

FIG. 8 illustrates a schematic block diagram of an example overlay network with source address translation. In order to implement source address translation, an access switch may maintain associations between hosts and tunnel endpoints for all the hosts that are reachable via its front panel ports. When the access switch receives encapsulated traffic from their subsidiary tunnel endpoints, in addition to learning the actual associations between the hosts and the tunnel endpoints specified in the packet, it could also claim ownership of the source address by overwriting the overlay IP source address with its own tunnel endpoint address. With this source address translation mechanism, it may appear to other network devices in the overlay network as though all those hosts have the access switch as their tunnel endpoint. In addition, by overwriting the IP source address of the encapsulated packet on the egress path, the access switch may proxy for the tunnel endpoint in the network such that any host movements below the access switch may not be visible to other tunnel endpoints, hence significantly reducing the amount of updates needed for the lookup tables in those other tunnel endpoints. For example, even if host 606B were to migrate from VTEP 604B to VTEP 604C, VTEP 604E need not update its routing table regarding host 606B because host 606B would still be associated with the same IP address, namely the tunnel endpoint address for access switch 602A.

On the other hand, when the incoming traffic arrives at the access switch, the access switch can examine the inner host destination address in the packet to determine how it may forward the packet. Moreover, if the packet is headed to a tunnel endpoint that is attached to the access switch's front panel port, the access switch can rewrite the overlay IP destination address with the final tunnel endpoint address before forwarding the packet down to the local tunnel endpoint. In other words, by overwriting the IP source address of the encapsulated packet on the ingress path, the access switch can proxy for all the tunnel endpoints below it such that other tunnel endpoints in the overlay network may only need to maintain the encapsulation information for access switches. Consequently, a hierarchy of overlay network encapsulations may be achieved. This allows the overlay network to advantageously support significantly more number of tunnel endpoints across the fabric. In some embodiments, the overlay network hierarchy may be further layered by attaching one or more access switches to another access switch that may function as a proxy for the other access switches below it.

As an example, an example packet originating from host 606C and destined for host 606F may traverse overlay network 800 while being encapsulated, translated, and de-encapsulated. The various components and contents of the packet will be illustrated in terms of example encapsulation layout 500 of FIG. 5. First, an L2 packet, such as an Ethernet packet, is generated by host 606C. The packet may have the MAC address 33:33:33:33:33:33 as its inner MAC source address 508 and 66:66:66:66:66:66 as its inner MAC destination address 506. The main information that the packet is trying to deliver to host 606F may be contained in its Ethernet payload 510. Once host 606C generates the packet, it forwards the packet to VTEP 604C (802A). VTEP 604C may then perform MAC-in-UDP encapsulation on the packet by appending overlay network encapsulation header 504, such as a VXLAN header, to the L2 packet. VTEP 604C may first look up inner MAC destination address 506 in a lookup table, such as encapsulation table 700 as shown in FIG. 7, to determine the destination tunnel endpoint address. In this example, the destination tunnel endpoint address that is associated with host 606F turns out to be 10.1.1.8. VTEP 604C can use this address as outer IP destination address 518 and its own IP address, 10.1.1.3, as outer IP source address 520. VTEP 604C may also insert its MAC address as outer MAC source address 516 and the MAC address for access switch 602B as outer MAC destination address 514.

Subsequently, VTEP 604C may forward the encapsulated packet to access switch 602A (802B). Upon receiving the encapsulated packet, access switch 602A may take ownership of the packet by performing source address translation on the packet. In other words, access switch 602A may swap original outer IP source address 520 with its own IP address, which is 10.1.1.7. Thus, subsequent network nodes or terminals that may receive the translated packet may only recognize the translated packet as originating from access switch 602A and may not know of the existence of its original encapsulating tunnel endpoint 604C. After inserting the translated source address, access switch 602A may transmit the encapsulated packet towards the packet's destination tunnel endpoint address (i.e., 10.1.1.8) via network 402 (802C). The encapsulated packet eventually reaches access switch 602B via network 402 (802D).

Upon receiving the encapsulated packet from access switch 602A, access switch 602B may refer to its own lookup table to determine that the host corresponding to the destination host address (i.e., 66:66:66:66:66:66) is connected to VTEP 604E, which is located behind access switch 602B. In order to further route the packet to its intended destination, access switch 602B may perform another address translation step to swap outer IP destination address 518 with the IP address of VTEP 604E (i.e., 10.1.1.5). With the new destination tunnel endpoint address written in its header, the encapsulated packet may be forwarded by access switch 602B to VTEP 604E (802E). Finally, VTEP 604E may de-encapsulate the packet by removing encapsulation header 504, and forward the resulting L2 data frame to its final destination, host 606F (802F).

The source address translation process may be implemented by the following example pseudo-code:

TABLE 1

Unicast case:
infra attach destination, unidestination packet
...
if EgrFields.EgrEncapValid:
    pkt.outer.DIP = EncapEntry.DIP
    pkt.outer.SMAC
        = self.EgrSrcEncap[EgrFields.OverlayInst].SMAC
    pkt.outer.SIP
        = self.EgrSrcEncap[EgrFields.OverlayInst].SIP
    pkt.outer.VLAN TABLE 1-continued

```
        = self.EgrSrcEncap[EgrFields.OverlayInst].VLAN
    pkt.outer.DMAC = self.Config.MAC
```

TABLE 2

```
Multicast case:
# this is a multi-destination packet because
# NMetPtr is not NULL need to walk through the
# NMetTable after modifying the packet properly
Done= False
NMetPtr = EncapEntry.NMetPtr
while not Done:
    #make a copy of the packet
    ...
    #modify the packet headers
    if EgrFields.EgrEncapValid:
        newpkt.outer.SMAC
            = self.EgrSrcEncap[OverlayInst].SMAC
        newpkt.outer.SIP
            = self.EgrSrcEncap[OverlayInst].SIP
        newpkt.outer.VLAN
            = self. EgrSrcEncap[OverlayInst].VLAN
```

Figure 9A:
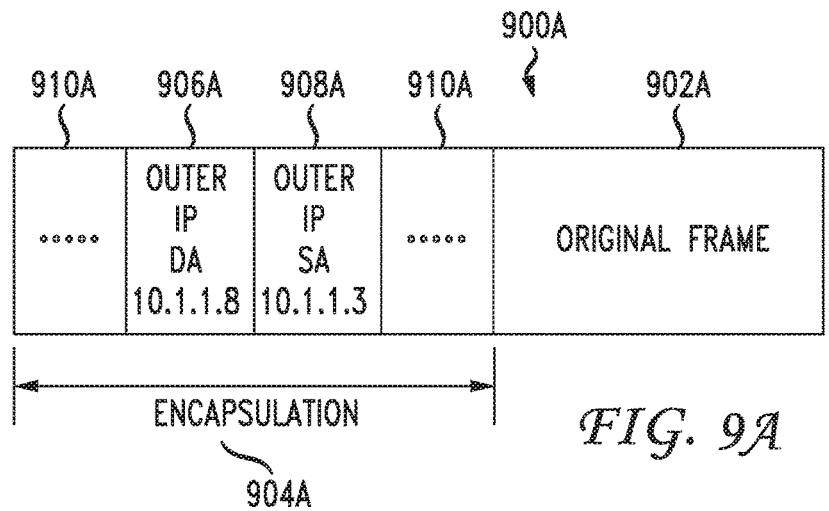
FIGS. 9A-C illustrate source address translation in an example encapsulated packet.
Figure 9B:
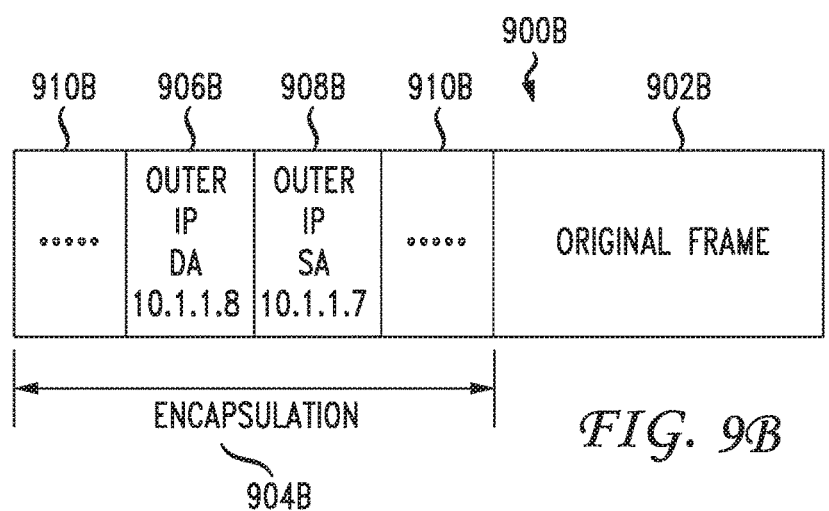
Figure 9C:
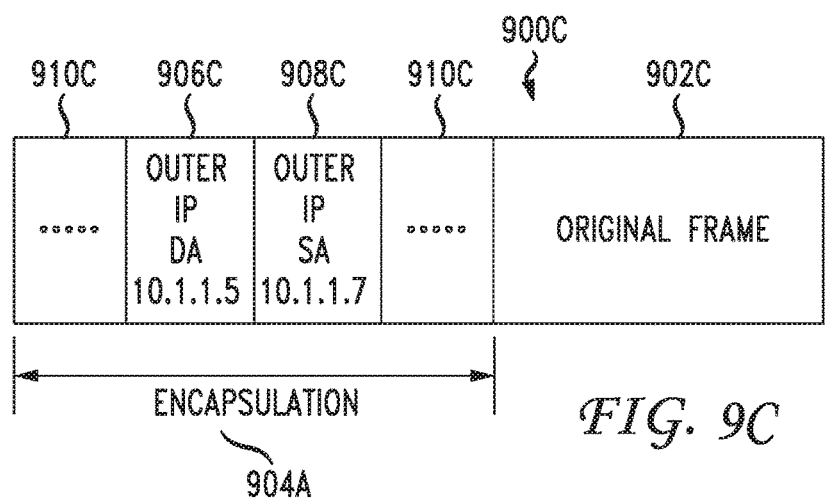

FIGS. 9A-C illustrate source address translation in an example encapsulated packet. In particular, in FIG. 9A, encapsulation packet 900A may be the example packet from the previous example shown in FIG. 8. Encapsulation packet 900A may consist of original frame 902A, outer IP destination address 906A, outer IP source address 908A, and other miscellaneous data 910A. One of skill in the art will readily recognize that the layout may be implemented in any other combination thereof, including combinations that exclude, add, or modify certain data bits. When VTEP 604C encapsulates original frame 902A with encapsulation header 904A, tunnel endpoint 604C may insert its own tunnel endpoint address 10.1.1.3 into outer IP source address field 908A. In addition, after consulting the lookup table, VTEP 604C may determine that the VTEP address associated with the recipient host is 10.1.1.8. Accordingly, VTEP 604C may insert that address into outer IP destination address field 906A.

FIG. 9B illustrates encapsulation packet 900B after it reaches access switch 602A and undergoes source address translation. In this example, outer IP source address 908B is replaced by 10.1.1.7, which is the tunnel endpoint IP address for access switch 602A. In this way, access switch 602A has taken ownership of the outbound traffic. FIG. 9C illustrates encapsulation packet 900C after it is transmitted via network 402 and received by access switch 602B. In order to further route encapsulated packet 902C to its intended recipient (i.e., host 606F), access switch 602B may look up the packet's destination host address in the encapsulation table and determine that the host resides under VTEP 604E. Access switch 602B may then rewrite the packet's overlay destination IP address 906C with the tunnel endpoint IP address of VTEP 604E, which is 10.1.1.5. Now encapsulated packet 900C may be appropriately routed to VTEP 604E.

Figure 10:
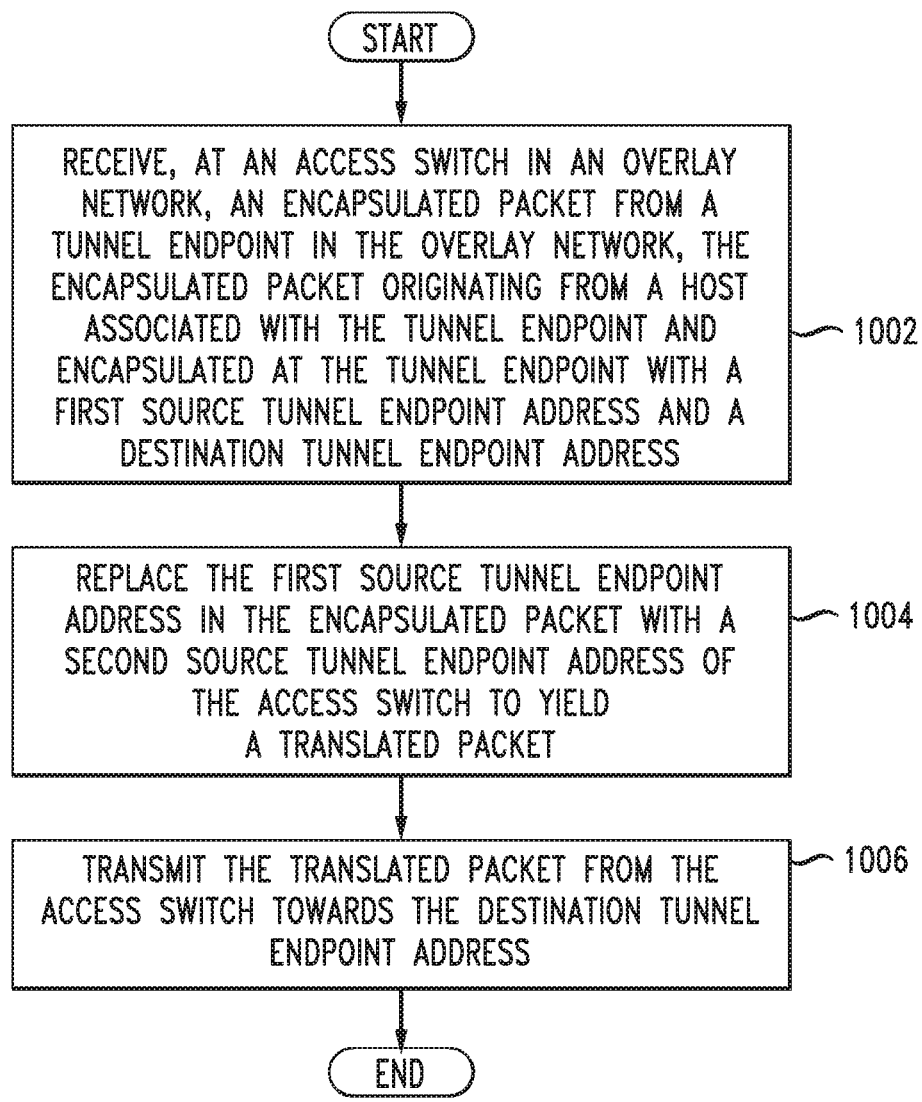
FIG. 10 illustrates an example method embodiment.
Figure 11:
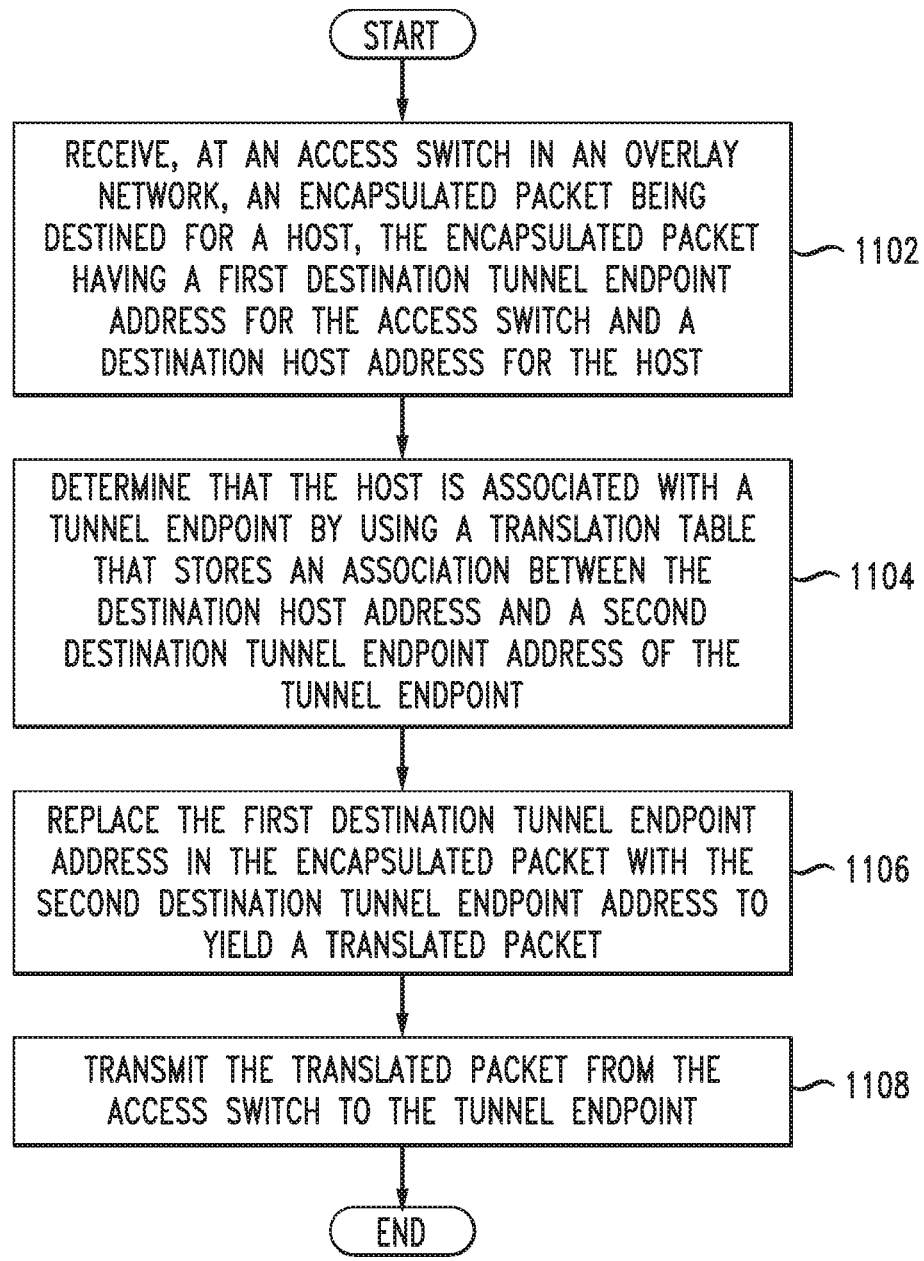
FIG. 11 illustrates another example method embodiment.

Having disclosed some basic system components and concepts, the disclosure now turns to the example method embodiments shown in FIGS. 10-11. For the sake of clarity, the methods are described in terms of system 110, as shown in FIG. 1, configured to practice the method. Altevively, the methods can be practiced by system 200 as shown in FIG. 2A, computer system 250 as shown in FIG. 2B, or any of endpoints 310 as shown in FIG. 3. The steps outlined herein are exemplary and can be implemented in any combination thereof in any order, including combinations that exclude, add, or modify certain steps.

FIG. 10 illustrates an example method embodiment. First, system 110 may receive, at an access switch in an overlay network, an encapsulated packet from a tunnel endpoint in the overlay network, the encapsulated packet originating from a host associated with the tunnel endpoint and encapsulated at the tunnel endpoint with a first source tunnel endpoint address and a destination tunnel endpoint address (1002). The overlay network may be a VXLAN and the tunnel endpoint can be a VTEP. The encapsulated packet may be an OSI layer 3 packet, such as a UDP packet, and the packet may be encapsulated at the tunnel endpoint using MAC-in-UDP encapsulation. Moreover, the first source tunnel endpoint address, the second source tunnel endpoint address, and the destination tunnel endpoint address can be L3 addresses, such as IP addresses. System 110 can record, in a translation table at the access switch, an association between the host and the first source tunnel endpoint address.

System 110 may then replace the first source tunnel endpoint address in the encapsulated packet with a second source tunnel endpoint address of the access switch to yield a translated packet (1004). Then, system 110 may transmit the translated packet from the access switch towards the destination tunnel endpoint address (1006). In some embodiments, the destination tunnel endpoint address may belong to another tunnel endpoint in the overlay network. In other embodiments, the destination tunnel endpoint address may belong to another access switch in the overlay network. The other access switch may be configured to forward the translated packet to a tunnel endpoint that is associated with that access switch.

Additionally, system 110 may receive, at the access switch, an incoming encapsulated packet that is destined for the host. The incoming encapsulated packet may have the second source tunnel endpoint address in a destination tunnel endpoint address field. System 110 may determine that the host is associated with the first source tunnel endpoint address by using the translation table. System 110 may then rewrite the destination tunnel endpoint address field in the incoming encapsulated packet with the first source tunnel endpoint address to yield an incoming translated packet. System 110 can transmit the incoming translated packet from the access switch to the tunnel endpoint.

FIG. 11 illustrates another example method embodiment. System 110 may receive, at an access switch in an overlay network, an encapsulated packet that is destined for a host (1102). The encapsulated packet may have a first destination tunnel endpoint address for the access switch and a destination host address for the host (1102). The first destination tunnel endpoint address may be an L3 address, such as an IP address, and the destination host address may be an L2 address, such as a MAC address. System 110 may determine that the host is associated with a tunnel endpoint by using a translation table that stores an association between the destination host address and a second destination tunnel endpoint address of the tunnel endpoint (1104). The second destination tunnel endpoint may be an L3 address, such as an IP address. System can then replace the first destination tunnel endpoint address in the encapsulated packet with the second destination tunnel endpoint address to yield a translated packet (1106). The translated packet may be an L3 packet, such as a UDP packet. System may transmit the translated packet from the access switch to the tunnel endpoint (1108). The tunnel endpoint may be configured to de-encapsulate the translated packet to yield a de-encapsulated frame, and forward the de-encapsulated frame to the host. The de-encapsulated frame can be an L2 packet, such as a MAC frame.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs. Moreover, claim language reciting "at least one of" a set indicates that one member of the set or multiple members of the set satisfy the claim.

We claim:

1. A method comprising:
   receiving, at a first access switch in an overlay network, an encapsulated packet originating from a host associated with a tunnel endpoint and being encapsulated with a first source tunnel endpoint address and a destination tunnel endpoint address of a second access switch in the overlay network;
   replacing the first source tunnel endpoint address in the encapsulated packet with a second source tunnel endpoint address of the first access switch to yield a translated packet;
   transmitting the translated packet from the first access switch towards the second access switch; and
   wherein the second access switch is configured to forward the translated packet to a second tunnel endpoint associated with the second access switch.

2. The method of claim 1, further comprising receiving, at the first access switch, an incoming encapsulated packet being destined for the host, the incoming encapsulated packet having the second source tunnel endpoint address in a destination tunnel endpoint address field.

3. The method of claim 2, further comprising determining that the host is associated with the first source tunnel endpoint address by using a translation table at the first access switch.

4. The method of claim 2, further comprising rewriting the destination tunnel endpoint address in the incoming encapsulated packet with the first source tunnel endpoint address to yield an incoming translated packet.

5. The method of claim 4, further comprising transmitting the incoming translated packet from the first access switch to the second tunnel endpoint.

6. The method of claim 1, wherein the encapsulated packet is encapsulated at a first source tunnel endpoint by using media access control in user datagram protocol (MAC-in-UDP) encapsulation.

7. The method of claim 6, wherein the overlay network is a virtual extensible local area network (VXLAN) and the first source tunnel endpoint is a virtual tunnel endpoint (VTEP).

8. A system comprising:
   a processor; and a memory having stored therein instructions which, when executed by the processor, cause the system to perform operations comprising:

receiving, at a first access switch in an overlay network, an encapsulated packet originating from a host associated with a tunnel endpoint and being encapsulated with a first source tunnel endpoint address and a destination tunnel endpoint address of a second access switch in the overlay network;

replacing the first source tunnel endpoint address in the encapsulated packet with a second source tunnel endpoint address of the first access switch to yield a translated packet;

transmitting the translated packet from the first access switch towards the second access switch; and wherein the second access switch is configured to forward the translated packet to a second tunnel endpoint associated with the second access switch.

9. The system of claim 8, the operations further comprising receiving, at the first access switch, an incoming encapsulated packet being destined for the host, the incoming encapsulated packet having the second source tunnel endpoint address in a destination tunnel endpoint address field.

10. The system of claim 9, the operations further comprising determining that the host is associated with the first source tunnel endpoint address by using a translation table at the first access switch.

11. The system of claim 9, the operations further comprising rewriting the destination tunnel endpoint address in the incoming encapsulated packet with the first source tunnel endpoint address to yield an incoming translated packet.

12. The system of claim 11, the operations further comprising transmitting the incoming translated packet from the first access switch to the second tunnel endpoint.

13. The system of claim 8, wherein the encapsulated packet is encapsulated at a first source tunnel endpoint by using media access control in user datagram protocol (MAC-in-UDP) encapsulation.

14. The system of claim 13, wherein the overlay network is a virtual extensible local area network (VXLAN) and the first source tunnel endpoint is a virtual tunnel endpoint (VTEP).

15. A non-transitory computer-readable storage media having stored therein instructions which, when executed by a processor, cause the processor to perform operations comprising:

receiving, at a first access switch in an overlay network, an encapsulated packet originating from a host associated with a tunnel endpoint and being encapsulated with a first source tunnel endpoint address and a destination tunnel endpoint address of a second access switch in the overlay network;

replacing the first source tunnel endpoint address in the encapsulated packet with a second source tunnel endpoint address of the first access switch to yield a translated packet;

transmitting the translated packet from the first access switch towards the second access switch; and wherein the second access switch is configured to forward the translated packet to a second tunnel endpoint associated with the second access switch.

16. The media of claim 15, the operations further comprising receiving, at the first access switch, an incoming encapsulated packet being destined for the host, the incoming encapsulated packet having the second source tunnel endpoint address in a destination tunnel endpoint address field.

17. The media of claim 16, the operations further comprising determining that the host is associated with the first source tunnel endpoint address by using a translation table at the first access switch.

18. The media of claim 16, the operations further comprising rewriting the destination tunnel endpoint address in the incoming encapsulated packet with the first source tunnel endpoint address to yield an incoming translated packet.

19. The media of claim 18, the operations further comprising transmitting the incoming translated packet from the first access switch to the second tunnel endpoint.

20. The media of claim 15, wherein the encapsulated packet is encapsulated at a first source tunnel endpoint by using media access control in user datagram protocol (MAC-in-UDP) encapsulation.

* * * * *